(12) United States Patent
Ogata et al.

(10) Patent No.: US 8,988,783 B2
(45) Date of Patent: Mar. 24, 2015

(54) ZOOM LENS AND IMAGE PICKUP APPARATUS EQUIPPED WITH SAME

(71) Applicant: Olympus Imaging Corp., Tokyo (JP)

(72) Inventors: Yasuji Ogata, Tokyo (JP); Yasuharu Yamada, Kanagawa (JP); Akiyoshi Tochigi, Tokyo (JP); Keitaro Yokoyama, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 3 days.

(21) Appl. No.: 14/044,176

(22) Filed: Oct. 2, 2013

(65) Prior Publication Data

US 2014/0139720 A1    May 22, 2014

(30) Foreign Application Priority Data

Nov. 22, 2012 (JP) ................................ 2012-256607

(51) Int. Cl.
  *G02B 15/14* (2006.01)
  *G02B 15/173* (2006.01)
(52) U.S. Cl.
  CPC .............. *G02B 15/173* (2013.01); *G02B 15/14* (2013.01)
  USPC ......................................... 359/684; 359/683
(58) Field of Classification Search
  CPC .............................. G02B 15/14; G02B 15/173
  USPC ................................................. 359/683, 684
  See application file for complete search history.

(56) References Cited

U.S. PATENT DOCUMENTS

| 6,449,433 | B2 | 9/2002 | Hagimori et al. | |
| 7,508,592 | B2 | 3/2009 | Harada | |
| 7,593,164 | B2 | 9/2009 | Souma | |
| 8,339,714 | B2* | 12/2012 | Tochigi et al. | 359/684 |
| 2008/0112064 | A1 | 5/2008 | Ishii et al. | |
| 2014/0118605 | A1* | 5/2014 | Kawamura | 348/345 |

FOREIGN PATENT DOCUMENTS

| JP | 2001-350093 | 12/2001 |
| JP | 2007-093976 | 4/2007 |
| JP | 2008-122676 | 5/2008 |
| JP | 2008-304706 | 12/2008 |

* cited by examiner

*Primary Examiner* — David N Spector
(74) *Attorney, Agent, or Firm* — Kenyon & Kenyon LLP

(57) ABSTRACT

A zoom lens comprising, in order from the object side to the image side a first lens unit having a positive refractive power, a second lens unit having a negative refractive power, a third lens unit having a positive refractive power, a fourth lens unit having a negative refractive power, and a fifth lens unit having a positive refractive power, wherein the first lens unit is located closest to the object side, the fifth lens unit is located closest to the image side, during zooming from the wide angle end to the telephoto end, the first lens unit, the second lens unit, the third lens unit, and the fourth lens unit move, the fifth lens unit is stationary, and the distances between the lens units vary, the third lens includes a positive lens, and the zoom lens satisfies the following condition (1):

$$72 < \nu_{3p} < 110 \qquad (1).$$

20 Claims, 25 Drawing Sheets

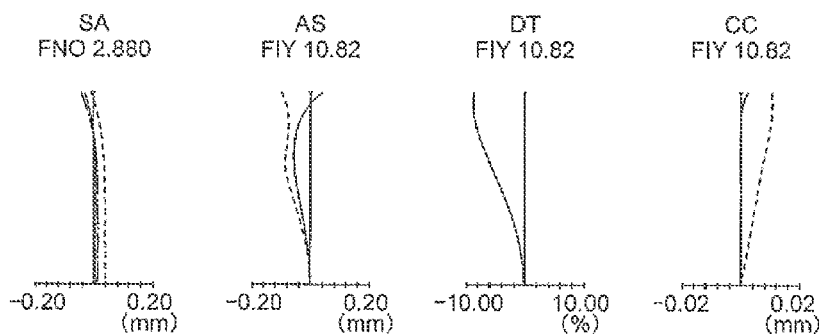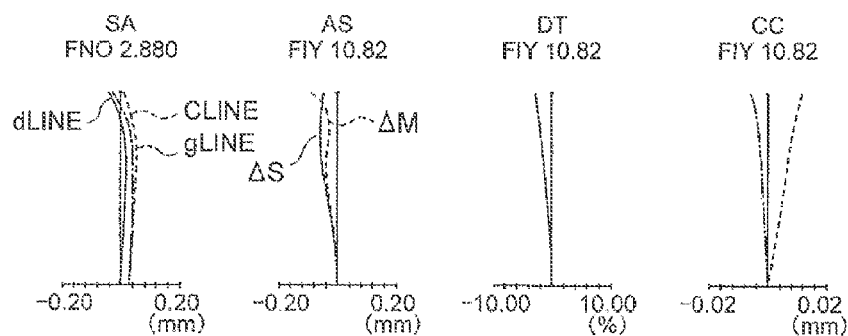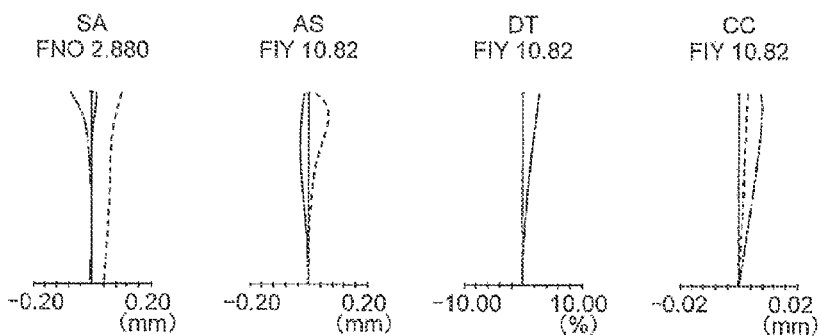

FIG. 9A  FIG. 9B  FIG. 9C  FIG. 9D
SA       AS       DT       CC
FNO 2.843  FIY 10.82  FIY 10.82  FIY 10.82
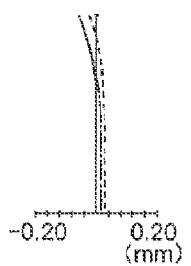 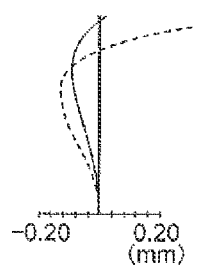 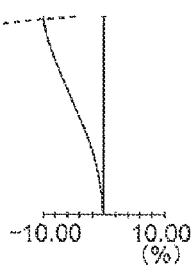 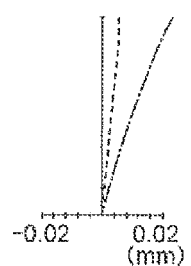
-0.20  0.20   -0.20  0.20   -10.00  10.00   -0.02  0.02
     (mm)         (mm)           (%)            (mm)
FIG. 9E  FIG. 9F  FIG. 9G  FIG. 9H
SA       AS       DT       CC
FNO 2.825  FIY 10.82  FIY 10.82  FIY 10.82
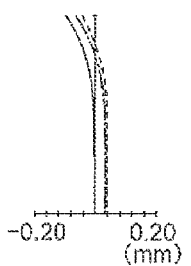 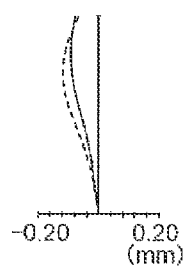 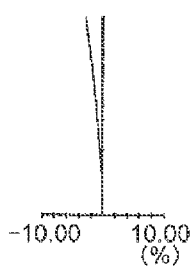 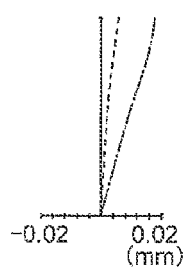
-0.20  0.20   -0.20  0.20   -10.00  10.00   -0.02  0.02
     (mm)         (mm)           (%)            (mm)
FIG. 9I  FIG. 9J  FIG. 9K  FIG. 9L
SA       AS       DT       CC
FNO 2.667  FIY 10.82  FIY 10.82  FIY 10.82
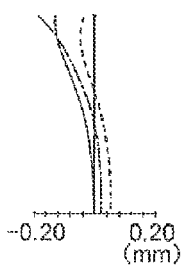 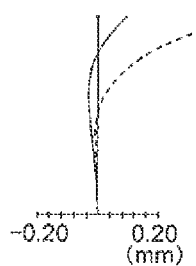 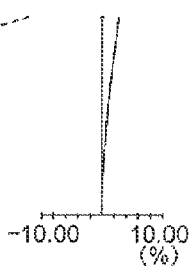 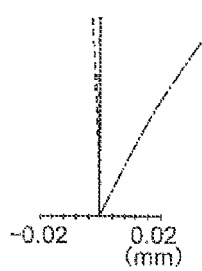
-0.20  0.20   -0.20  0.20   -10.00  10.00   -0.02  0.02
     (mm)         (mm)           (%)            (mm)

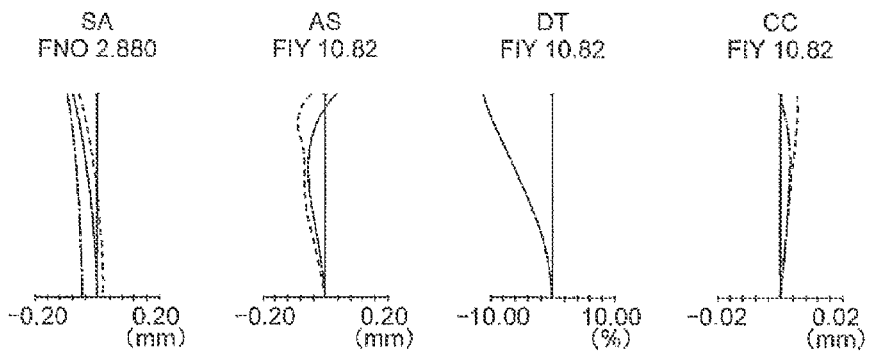
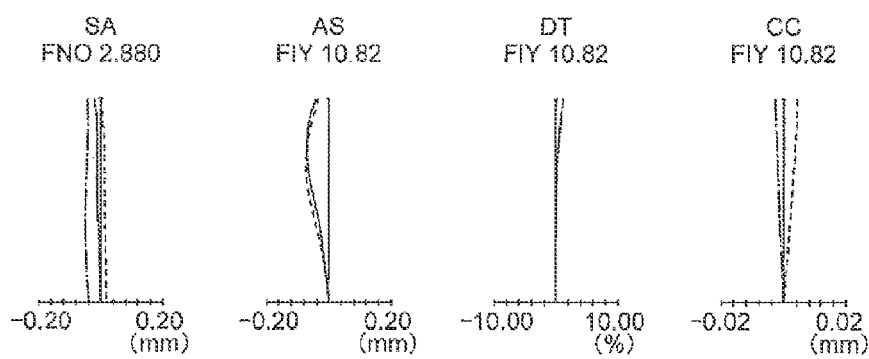
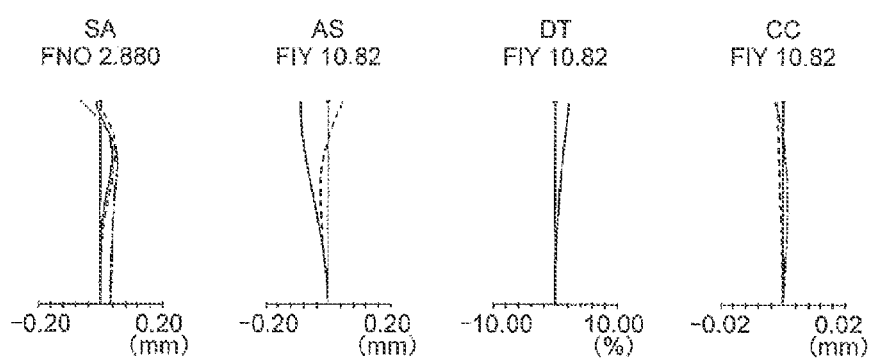

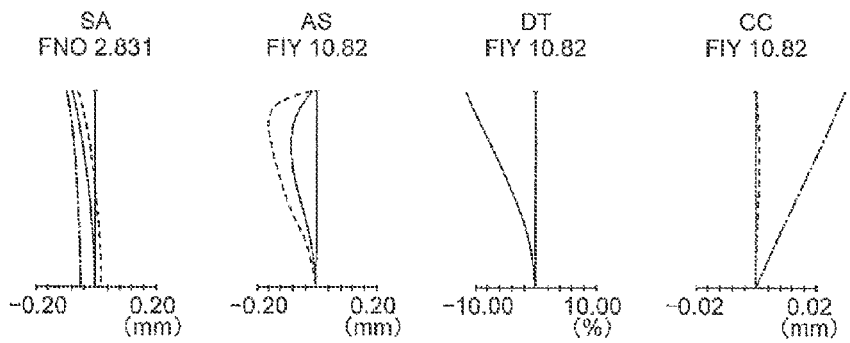
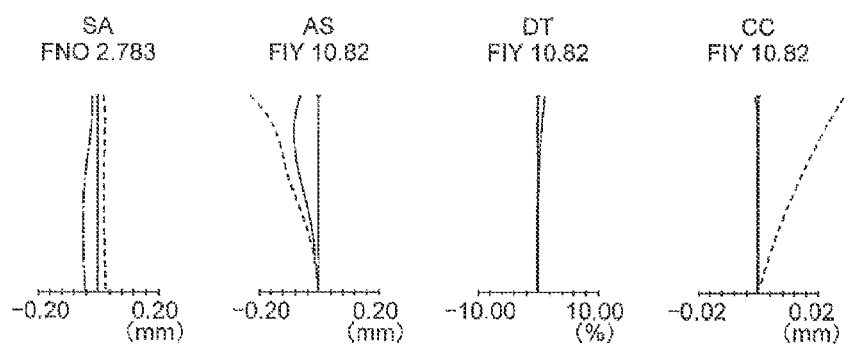
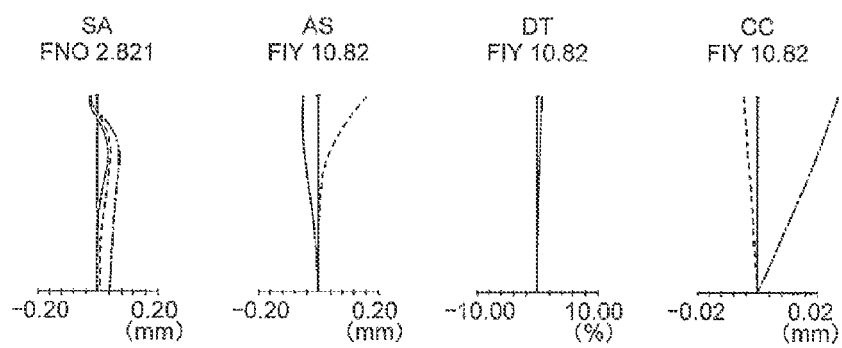

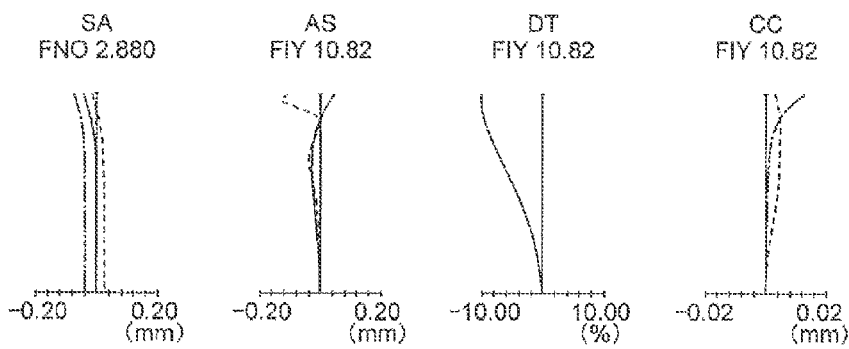
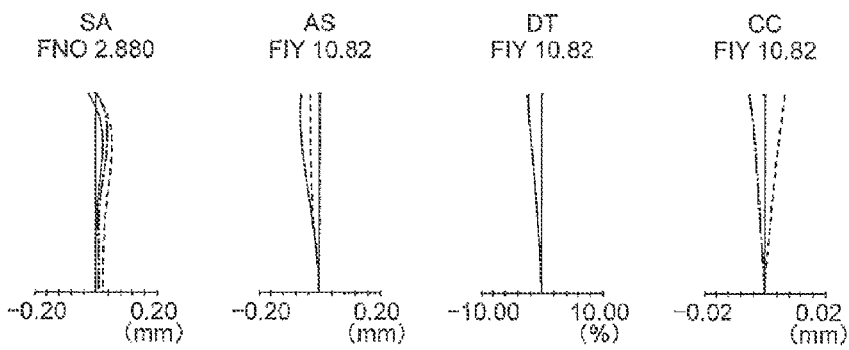
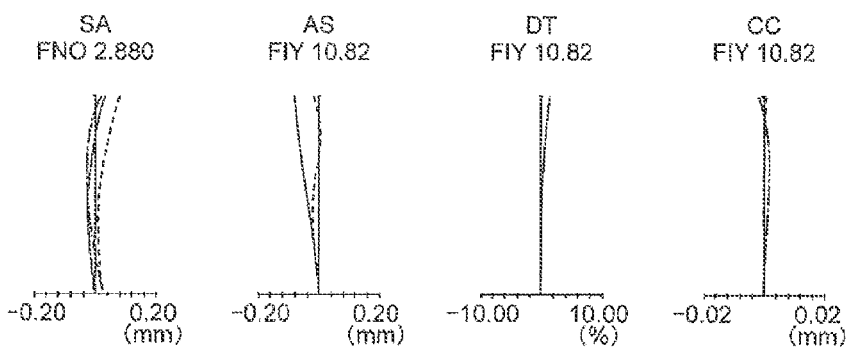

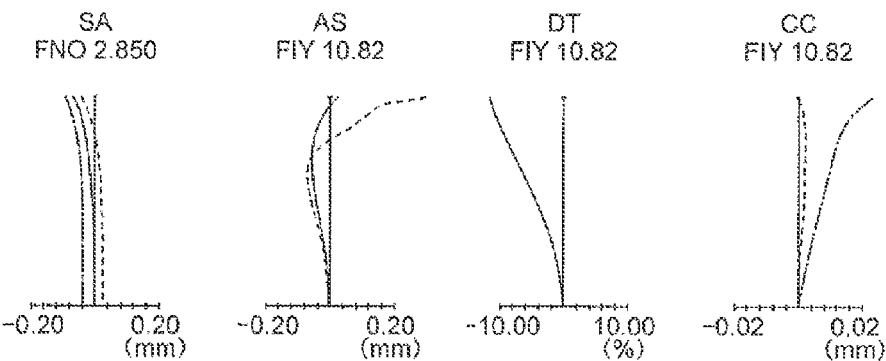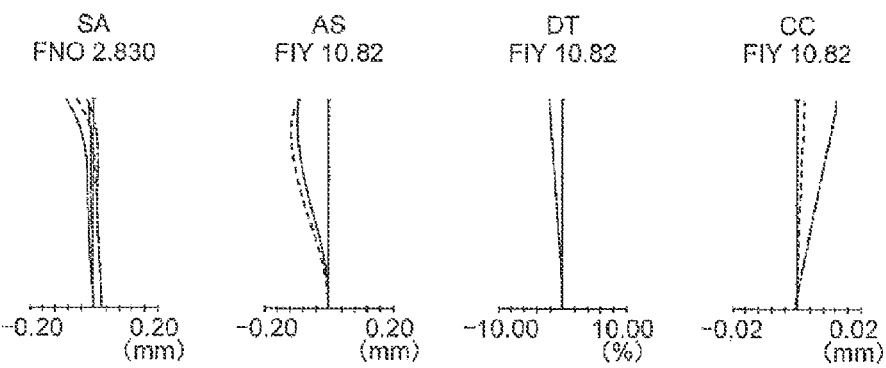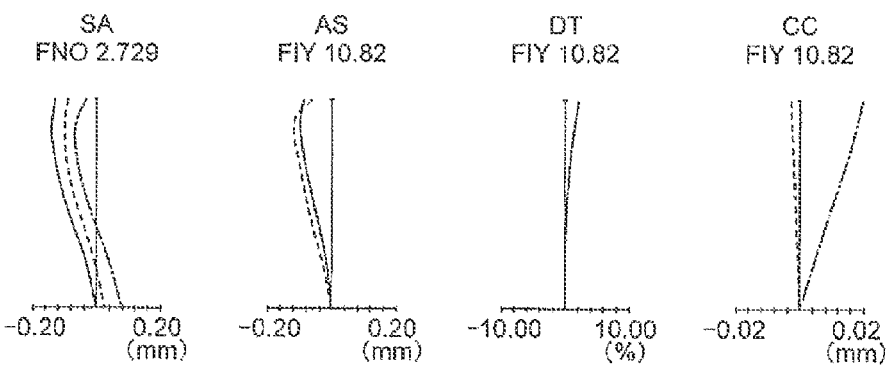

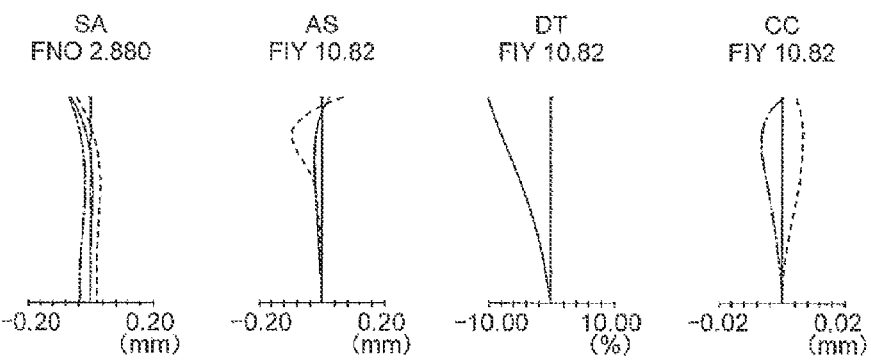
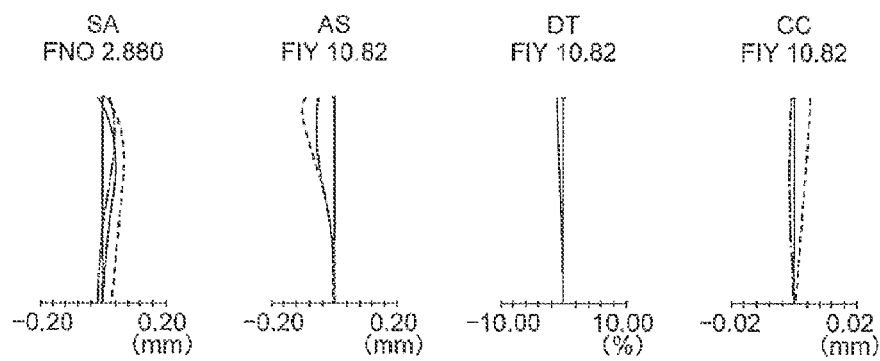
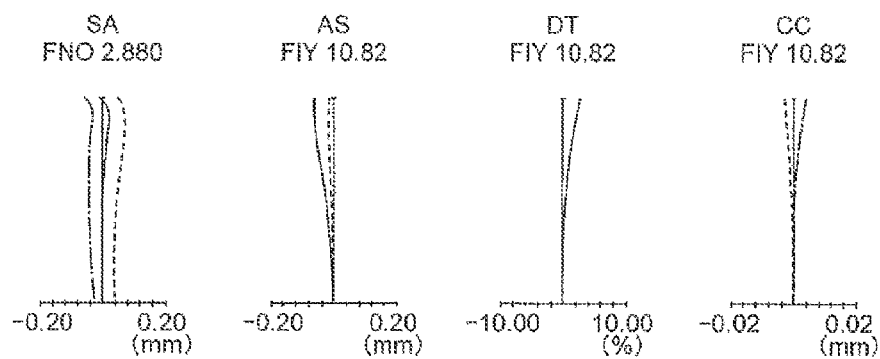

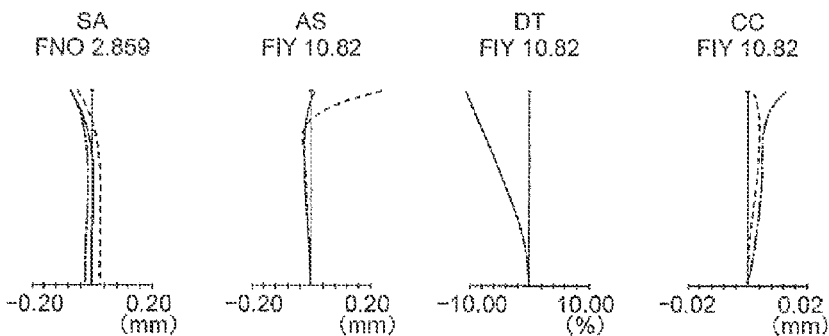
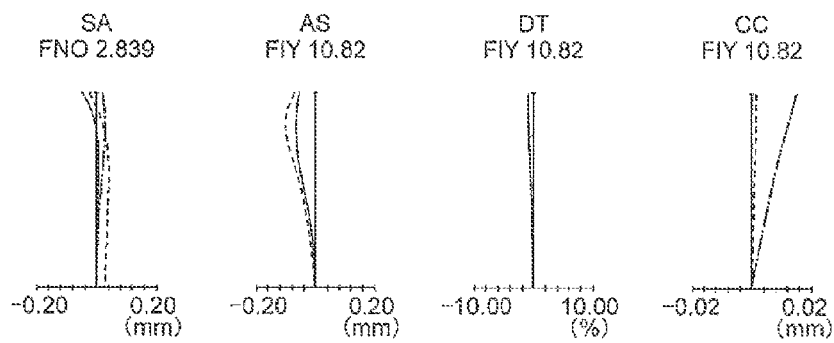
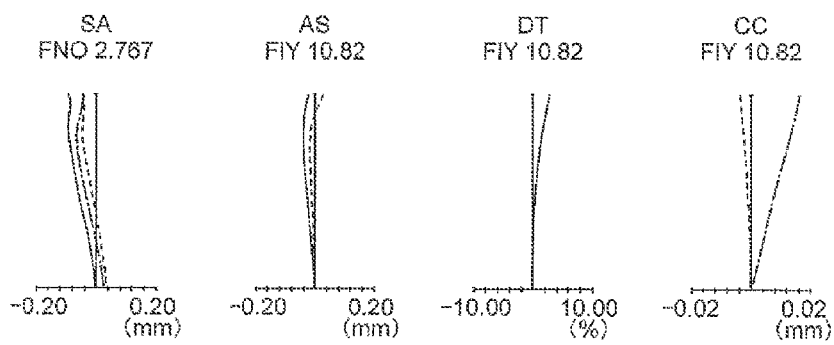

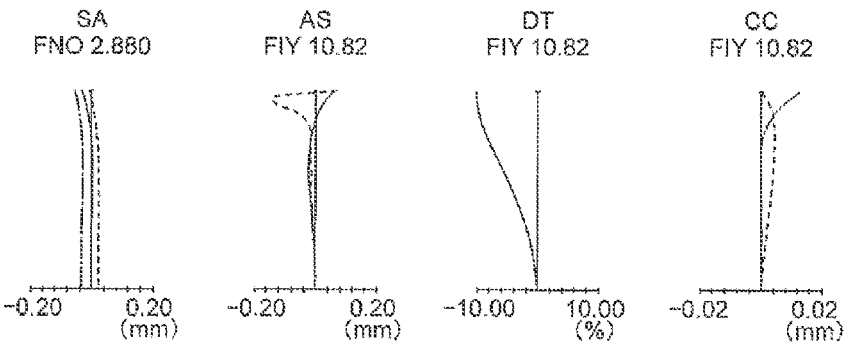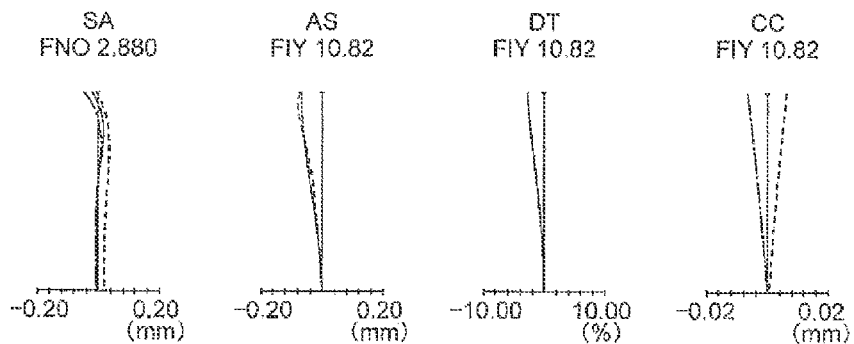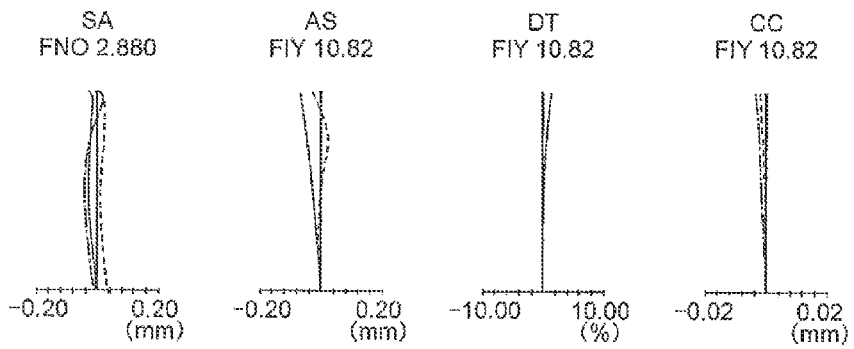

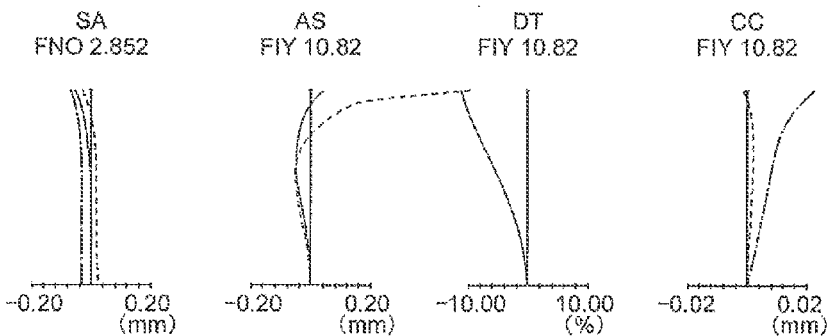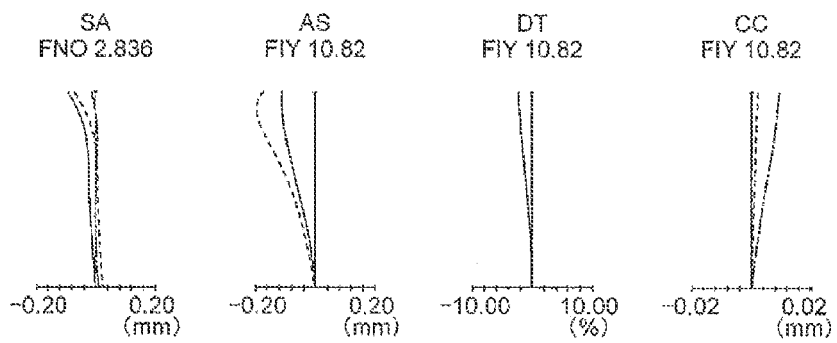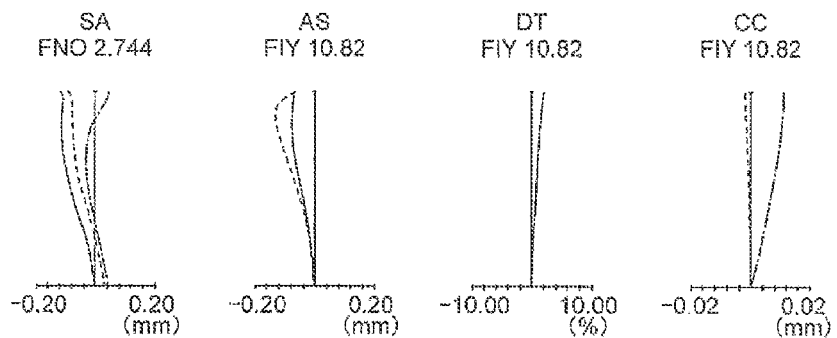

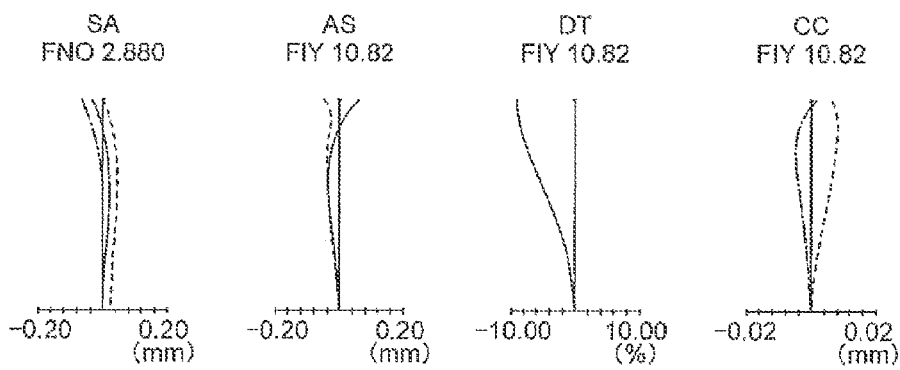
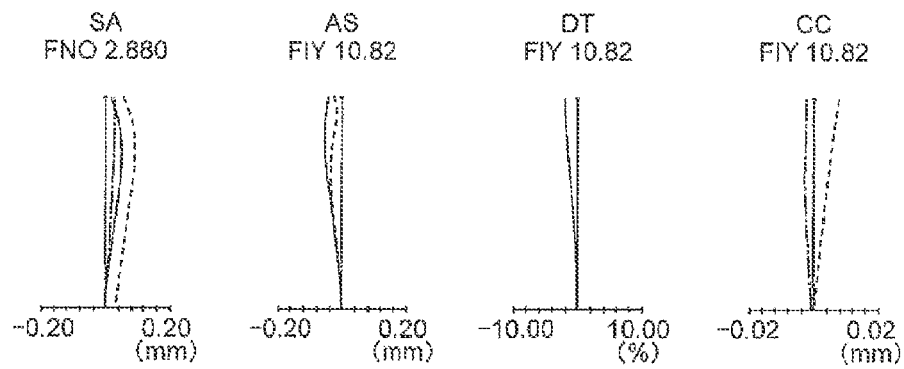
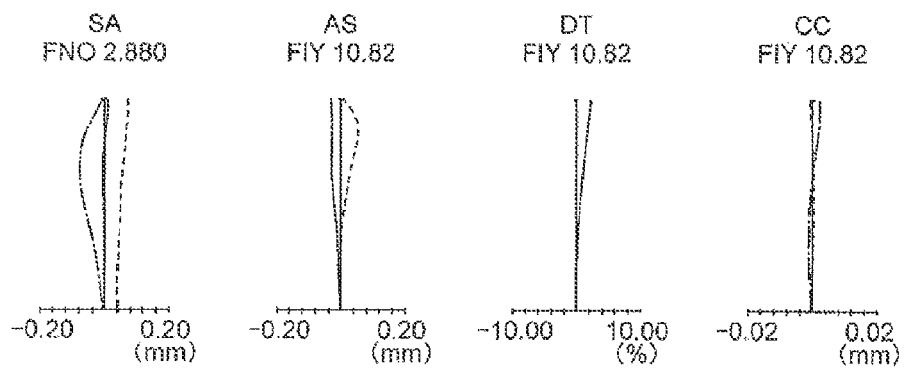

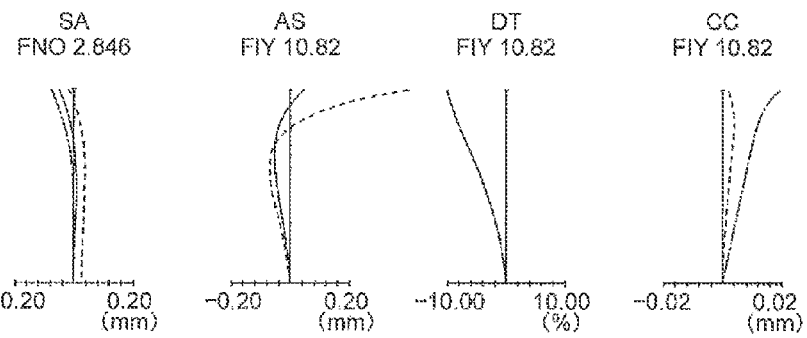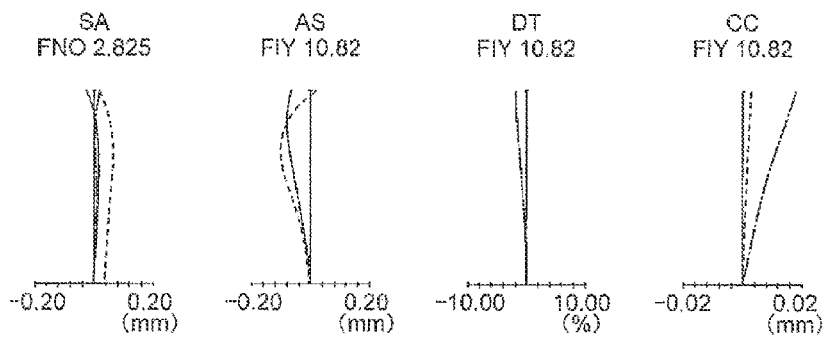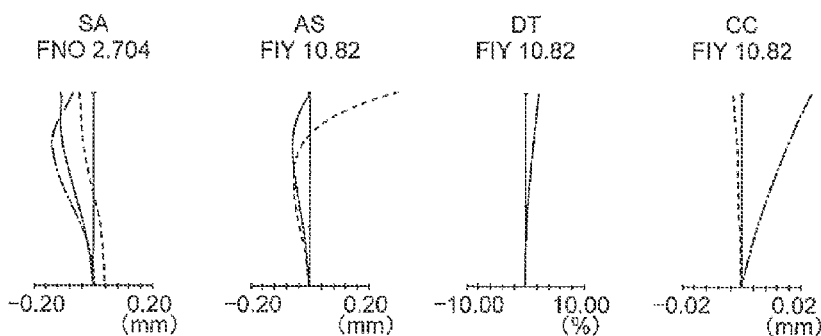

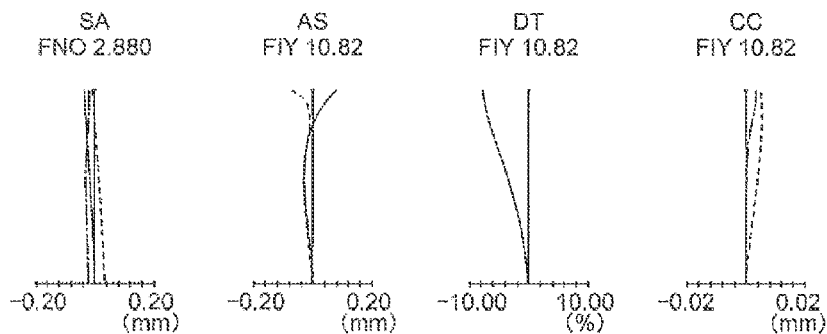
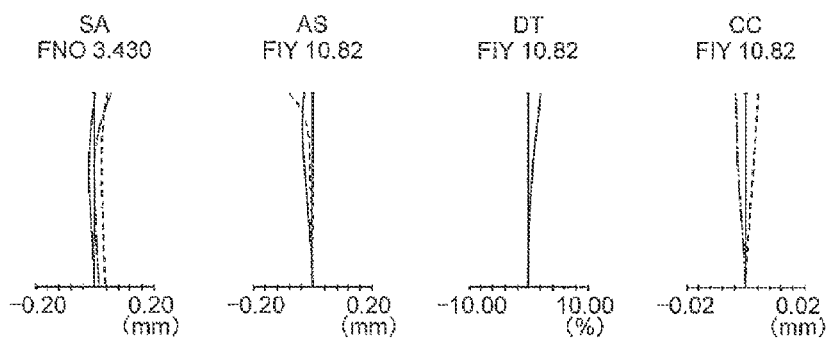
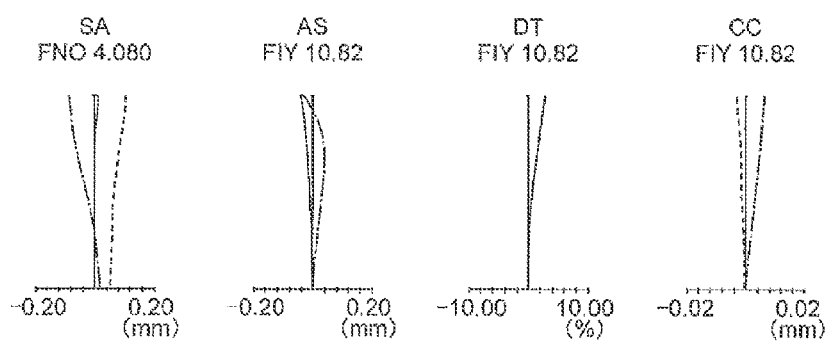

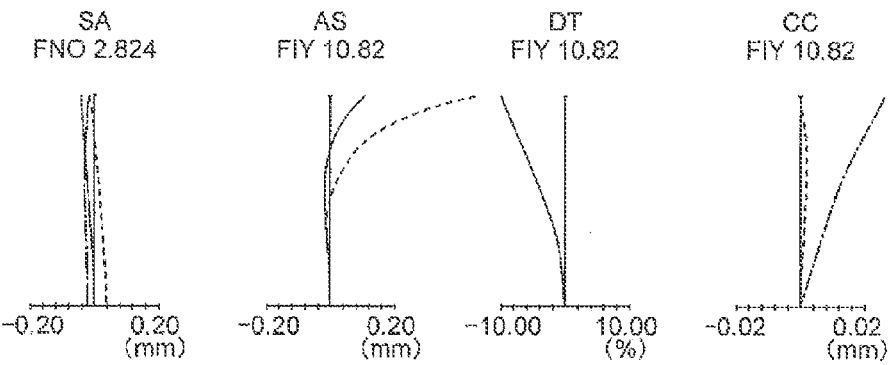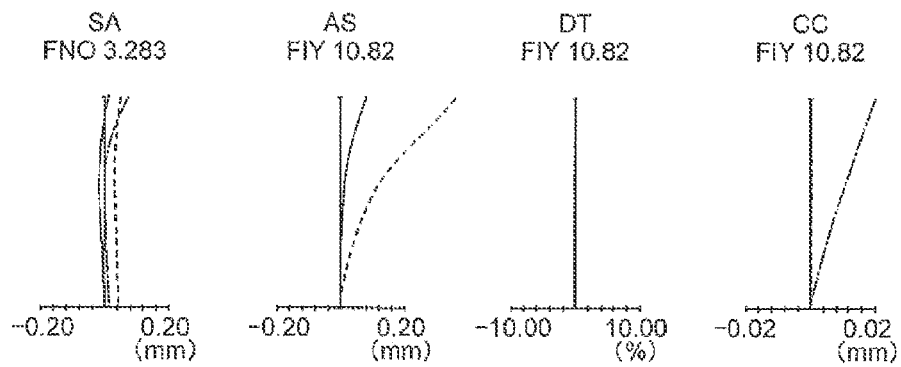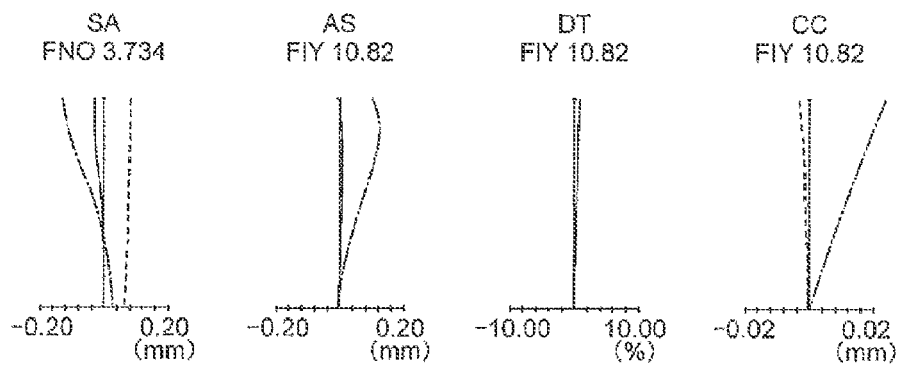

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2012-256607 filed on Nov. 22, 2012; the entire contents of which are incorporated herein by reference.

BACKGROUND OF THE INVENTION

1. Field of the Invention

The present invention relates to a zoom lens and an image pickup apparatus equipped with the same.

2. Description of the Related Art

Heretofore, as large-diameter standard zoom lenses, zoom lenses disclosed in Japanese Patent Application Nos. 2007-93976 and 2008-122676 have been known. The zoom lenses disclosed in Japanese Patent Application Nos. 2007-93976 and 2008-122676 are used as interchangeable lenses. The zoom lenses disclosed in Japanese Patent Application Nos. 2007-93976 and 2008-122676 have certain degrees of brightness throughout the entire zoom range.

The zoom lens disclosed in Japanese Patent Application No. 2007-93976 is a five-unit zoom lens, and a refractive power arrangement is, in order from the object side, a negative refractive power, a positive refractive power, a negative refractive power, a positive refractive power, and a positive refractive power. In this zoom lens, during zooming, the first to fourth lens units move, while the fifth lens remains stationary. When a frame that holds the optical system is regarded as a cylinder, the stationary fifth lens unit can function as a lid on one end of the cylinder. Therefore, the fifth lens unit that remains stationary helps reduction of dust entering the optical system. Some camera bodies are equipped with a microphone with which ambient sound can be captured at the time of shooting. In such cases, the stationary fifth lens unit helps reduction of operation noise generated by the zooming operation.

As to focusing, the zoom lens disclosed in Japanese Patent Application No. 2007-93976 employs the internal focusing scheme. Specifically, a sub lens unit in the second lens unit is moved during focusing.

The zoom lens according to Japanese Patent Application No. 2007-93976 having the above-described construction has a focal length that varies from approximately 24 mm to 50 mm by zooming and an F-number approximately equal to 2.8 over the entire zoom range.

The zoom lens disclosed in Japanese Patent Application No. 2008-122676 is a four-unit zoom lens, and a refractive power arrangement is, in order from the object side, a positive refractive power, a negative refractive power, a negative refractive power, and a positive refractive power. In this zoom lens, all the lens units move during zooming.

As to focusing, this zoom lens employs what is called floating mechanism. Specifically, the second lens unit and the third lens unit are moved independently during focusing.

The zoom lens disclosed in Japanese Patent Application No. 2008-122676 having the above-described construction has a focal length that varies from approximately 14 mm to 35 mm by zooming and an F-number approximately equal to 2.0 over the entire zoom range. This focal length range of 14 mm to 35 mm is equivalent to a focus range of 28 mm to 70 mm in the 135 format (which is commonly called Leica format). (In other words, the zoom lens according to the Japanese Patent Application No. 2008-122676 has an angle of view equivalent to that resulting from the focal length variation from 28 mm to 70 mm in the 135 format.)

SUMMARY OF THE INVENTION

A zoom lens comprises, in order from the object side to the image side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
the first lens unit is located closest to the object side among the lens units in the zoom lens,
the fifth lens unit is located closest to the image side among the lens units in the zoom lens,
during zooming from the wide angle end to the telephoto end, the first lens unit, the second lens unit, the third lens unit, and the fourth lens unit move, the fifth lens unit is stationary, and the distances between the lens units vary,
the third lens includes a positive lens, and
the following conditional expression (1) is satisfied:

$$72 < \nu_{3p} < 110 \quad (1),$$

where,
$\nu_{3p}$ is the Abbe constant of the positive lens in the third lens unit with respect to the d-line or the largest Abbe constant among the Abbe constants of positive lenses included in the third lens unit if the third lens unit includes two or more positive lenses.

A zoom lens comprises, in order from the object side to the image side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
the first lens unit is located closest to the object side among the lens units in the zoom lens,
the fifth lens unit is located closest to the image side among the lens units in the zoom lens,
during zooming from the wide angle end to the telephoto end, the first lens unit, the second lens unit, the third lens unit, and the fourth lens unit move, the fifth lens unit is stationary, and the distances between the lens units vary,
the third lens unit includes an aspheric lens surface,
the fourth lens unit moves during focusing, and
the following conditional expressions (2) and (3) are satisfied:

$$0.4 < |f_2|/FB < 1.5 \quad (2),$$

and $$0.5 < f_3/FB < 1.8 \quad (3),$$

where,
$f_2$ is the focal length of the second lens unit,
$f_3$ is the focal length of the third lens unit, and
FB is the equivalent air distance from the image side surface of the lens closest to the image side among the lenses in the zoom lens to the image plane.

A zoom lens comprises, in order from the object side to the image side:
a first lens unit having a positive refractive power;
a second lens unit having a negative refractive power;
a third lens unit having a positive refractive power;

a fourth lens unit having a negative refractive power; and
a fifth lens unit having a positive refractive power, wherein
the first lens unit is located closest to the object side among the lens units in the zoom lens,
the fifth lens unit is located closest to the image side among the lens units in the zoom lens,
during zooming from the wide angle end to the telephoto end, the first lens unit, the second lens unit, the third lens unit, and the fourth lens unit move, the fifth lens unit is stationary, and the distances between the lens units vary,
the third lens unit includes an aspheric lens surface,
the fourth lens unit moves during focusing, and
the following conditional expressions (10) and (11) are satisfied:

$$0.5 < |f_2|/i_h < 1.9 \quad (10),$$

and $$0.7 < f_3/i_h < 2.5 \quad (11),$$

where,
$f_2$ is the focal length of the second lens unit,
$f_3$ is the focal length of the third lens unit, and
$i_h$ is the largest image height in the entire zoom lens system.
An image pickup apparatus comprises:
a zoom lens; and
an image pickup element disposed on the image side of the zoom lens to convert an image formed by the zoom lens into an electrical signal.

BRIEF DESCRIPTION OF THE DRAWINGS

FIG. 1A shows the state at the wide angle end, FIG. 1B shows the state in an intermediate focal length state, and FIG. 1C shows the state at the telephoto end;

FIG. 2A shows the state at the wide angle end, FIG. 2B shows the state in an intermediate focal length state, and FIG. 2C shows the state at the telephoto end;

FIG. 3A shows the state at the wide angle end, FIG. 3B shows the state in an intermediate focal length state, and FIG. 3C shows the state at the telephoto end;

FIG. 4A shows the state at the wide angle end, FIG. 4B shows the state in an intermediate focal length state, and FIG. 4C shows the state at the telephoto end;

FIG. 5A shows the state at the wide angle end, FIG. 5B shows the state in an intermediate focal length state, and FIG. 5C shows the state at the telephoto end;

FIG. 6A shows the state at the wide angle end, FIG. 6B shows the state in an intermediate focal length state, and FIG. 6C shows the state at the telephoto end;

FIG. 7A shows the state at the wide angle end, FIG. 7B shows the state in an intermediate focal length state, and FIG. 7C shows the state at the telephoto end;

FIGS. 8A, 8B, 8C, 8D, 8E, 8F, 8G, 8H, 8I, 8J, 8K, and 8L are aberration diagrams of the zoom lens according to the first example in the state in which the zoom lens is focused on an object point at infinity:

FIGS. 9A, 9B, 9C, 9D, 9E, 9F, 9G, 9H, 9I, 9J, 9K, and 9L are aberration diagrams of the zoom lens according to the first example in the state in which the zoom lens is focused on an object point at a short distance:

FIGS. 10A, 10B, 10C, 10D, 10E, 10F, 10G, 10H, 10I, 10J, 10K, and 10L are aberration diagrams of the zoom lens according to the second example in the state in which the zoom lens is focused on an object point at infinity:

FIGS. 11A, 11B, 11C, 11D, 11E, 11F, 11G, 11H, 11I, 11J, 11K, and 11L are aberration diagrams of the zoom lens according to the second example in the state in which the zoom lens is focused on an object point at a short distance:

FIGS. 12A, 12B, 12C, 12D, 12E, 12F, 12G, 12H, 12I, 12J, 12K, and 12L are aberration diagrams of the zoom lens according to the third example in the state in which the zoom lens is focused on an object point at infinity:

FIGS. 13A, 13B, 13C, 13D, 13E, 13F, 13G, 13H, 13I, 13J, 13K, and 13L are aberration diagrams of the zoom lens according to the third example in the state in which the zoom lens is focused on an object point at a short distance:

FIGS. 14A, 14B, 14C, 14D, 14E, 14F, 14G, 14H, 14I, 14J, 14K, and 14L are aberration diagrams of the zoom lens according to the fourth example in the state in which the zoom lens is focused on an object point at infinity:

FIGS. 15A, 15B, 15C, 15D, 15E, 15F, 15G, 15H, 15I, 15J, 15K, and 15L are aberration diagrams of the zoom lens according to the fourth example in the state in which the zoom lens is focused on an object point at a short distance:

FIGS. 16A, 16B, 16C, 16D, 16E, 16F, 16G, 16H, 16I, 16J, 16K, and 16L are aberration diagrams of the zoom lens according to the fifth example in the state in which the zoom lens is focused on an object point at infinity:

FIGS. 17A, 17B, 17C, 17D, 17E, 17F, 17G, 17H, 17I, 17J, 17K, and 17L are aberration diagrams of the zoom lens according to the fifth example in the state in which the zoom lens is focused on an object point at a short distance:

FIGS. 18A, 18B, 18C, 18D, 18E, 18F, 18G, 18H, 18I, 18J, 18K, and 18L are aberration diagrams of the zoom lens according to the sixth example in the state in which the zoom lens is focused on an object point at infinity:

FIGS. 19A, 19B, 19C, 19D, 19E, 19F, 19G, 19H, 19I, 19J, 19K, and 19L are aberration diagrams of the zoom lens according to the sixth example in the state in which the zoom lens is focused on an object point at a short distance:

FIGS. 20A, 20B, 20C, 20D, 20E, 20F, 20G, 20H, 20I, 20J, 20K, and 20L are aberration diagrams of the zoom lens according to the seventh example in the state in which the zoom lens is focused on an object point at infinity:

FIGS. 21A, 21B, 21C, 21D, 21E, 21F, 21G, 21H, 21I, 21J, 21K, and 21L are aberration diagrams of the zoom lens according to the seventh example in the state in which the zoom lens is focused on an object point at a short distance:

DETAILED DESCRIPTION OF THE INVENTION

Figure 1A:
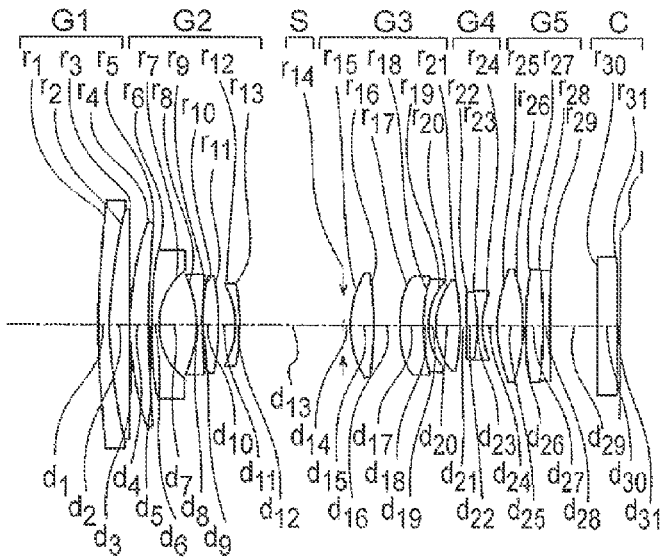
FIGS. 1A, 1B, and 1C are cross sectional views of a zoom lens according to a first example of the present invention in the state in which the zoom lens is focused on an object point at infinity, where

In the following, embodiments and examples of the zoom lens and the image pickup apparatus equipped with the same according to the present invention will be described in detail with reference to the drawings. It should be understood, however, that the present invention is by no means limited by the embodiments and examples.

Firstly, the basic configuration of a zoom lens according to an embodiment will be described. As the basic configuration, the zoom lens comprises, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, wherein the first lens unit is located closest to the object side among the lens units in the zoom lens, and the fifth lens unit is located closest to the image side among the lens units in the zoom lens. In addition, during zooming from the wide angle end to the telephoto end, the first lens unit, the second lens unit, the third lens unit, and the fourth lens unit move, the fifth lens unit is stationary, and the distances between the lens units vary. The basic configuration is as above.

The zoom lens is required to have a wide angle of view at the wide angle end of the zoom range, and to balance securing a sufficient brightness throughout the entire zoom range with securing a sufficiently large zoom ratio. To meet these requirements, it is necessary that correction of off-axis aberrations in the focal length range near the wide angle end and correction of axial aberrations in the focal length range near the telephoto end. Therefore, in the zoom lens according to the embodiment having the above-described basic configuration, a refractive power arrangement is, in order from the object side to the image side, a positive refractive power, a negative refractive power, a positive refractive power, a negative refractive power, and a positive refractive power. This symmetric refractive power arrangement helps reduction of aberrations throughout the entire zoom range from the wide angle end to the telephoto end and allows the zoom lens to be designed to have sufficient brightness and large zoom ratio.

The negative refractive power of the fourth lens unit and the positive refractive power of the fifth lens unit help the exit pupil to be located at an appropriately large distance from the image plane and facilitate reduction of the overall length of the zoom lens. Moreover, the fifth lens unit is kept stationary during zooming. This is favorable in reducing dust entering the optical system and in reducing operation noise generated by the zooming operation.

It is preferred that the zoom lens according to the embodiment has one of the following features while having the above-described basic configuration.

In a zoom lens according to a first embodiment, it is preferred that the third lens unit includes a positive lens and the following conditional expression (1) be satisfied:

$$72 < v_{3p} < 110 \quad (1),$$

where, $v_{3p}$ is the Abbe constant of the positive lens in the third lens unit with respect to the d-line or the largest Abbe constant among the Abbe constants of the positive lenses included in the third lens unit if the third lens unit includes two or more positive lenses.

The conditional expression (1) is a conditional expression which is advantageous for correction of axial chromatic aberration in the focal length range near the telephoto end. Satisfying conditional expression (1) is favorable for formation of excellent images with little color misregistration. In consequence, when an image of an object is picked up by an image pickup element or the like, an excellent image with little color misregistration can be obtained.

By making so as not to fall below the lower limit of conditional expression (1), correction of chromatic aberration, in particular axial chromatic aberration, can be corrected favorably, and sharp images can be obtained. In consequence, when an image of an object is picked up by an image pickup element or the like, a sharp image is likely to be obtained. That aberrations can be corrected favorably means that aberrations can be corrected excellently (aberrations can be made sufficiently small). On the other hand, by making so as not to exceed the upper limit of conditional expression (1), correction of chromatic aberration can be achieved while using a commonly available glass material. The use of a commonly available material is preferable for cost reduction.

In a zoom lens according to a second embodiment, it is preferred that the third lens unit includes an aspheric lens surface, the fourth lens unit moves during focusing, and the following conditional expressions (2) and (3) be satisfied:

$$0.4 < |f_2|/FB < 1.5 \quad (2),$$

and $$0.5 < f_3/FB < 1.8 \quad (3),$$

where, $f_2$ is the focal length of the second lens unit, $f_3$ is the focal length of the third lens unit, and FB is the equivalent air distance from the image side surface of the lens closest to the image side among the lenses in the zoom lens to the image plane.

Since the fifth lens unit is stationary during zooming, the back focus does not vary with zooming. Moderately short back focus helps reduction of the overall length of the zoom lens while allowing the zoom lens to be designed to have improved optical performance. Appropriately long back focus can prevent interference of the zoom lens with a camera body when the zoom lens is used as an interchangeable lens. On the assumption that the zoom lens is used with an interchangeable-lens camera having no quick return mirror, it is preferred that the above conditional expressions (2) and (3) be satisfied.

By making so as not to fall below the lower limits of conditional expression (2) and (3), the refractive powers of the second lens unit and the third lens unit are not so large. This is advantageous for correction of aberrations, for securing a sufficient brightness, and leads to a reduction in the number of lenses. On the other hand, by making so as not to exceed the upper limits of conditional expression (2) and (3), insufficient refractive powers of the second and third lens units can be prevented. This allows the amount of movement of the lens units that move during zooming to be made smaller, allowing reduction of the overall length of the zoom lens. The value of FB in conditional expressions (2) and (3) may be a value of back focus.

In a zoom lens according to a third embodiment, it is preferred that the third lens unit includes an aspheric lens surface, the fourth lens unit moves during focusing, and the following conditional expressions (10) and (11) be satisfied:

$$0.5<|f_2|/i_h<1.9 \quad (10),$$

and $$0.7<f_3/i_h<2.5 \quad (11),$$

where,
$f_2$ is the focal length of the second lens unit,
$f_3$ is the focal length of the third lens unit, and
$i_h$ is the largest image height in the entire zoom lens system.

By making so as not to fall below the lower limits of conditional expression (10) and (11), the refractive powers of the second lens unit and the third lens unit are not so large. This is advantageous for correction of aberrations, for securing a sufficient brightness, and leads to a reduction in the number of lenses. On the other hand, by making so as not to exceed the upper limits of conditional expression (10) and (11), insufficient refractive powers of the second and third lens units can be prevented. This allows the amount of movement of the lens units that move during zooming to be made smaller, allowing reduction of the overall length of the zoom lens.

In the zoom lenses according to the first to third embodiments (which will be hereinafter collectively referred to as the zoom lens according to the embodiment), it is preferred that the following conditional expressions (1-1), more preferably conditional expression (1-2) be satisfied:

$$75<\nu_{3p}<110 \quad (1\text{-}1),$$

$$77<\nu_{3p}<110 \quad (1\text{-}2).$$

In the zoom lens according to the embodiment, it is preferred that the fourth lens unit moves during focusing.

With this feature, while the focusing scheme in the zoom lenses according to the embodiments is internal focusing, variation of aberrations with focusing can easily be corrected.

Since the construction of the zoom lens according to the embodiment allows it to have sufficient brightness, the effective diameter of the fourth lens unit can be smaller than the effective diameter of the other lens units. Therefore, using the fourth lens unit as the focusing lens unit can lead to a reduction in the size and weight of the focusing lens unit. This is advantageous for reduction of operation noise generated by the zooming operation (noises generated by movement of lenses and operation noise of the driving system) with the zoom lens being a sufficiently bright optical system. Moreover, the fifth lens unit is stationary not only during zooming but also during focusing, even if the operation noise generated by the focusing operation is transferred to the camera body, the magnitude of the transferred noise will be small. Therefore, moving the fourth lens unit for focusing is favorable for reduction of the magnitude of the transferred noise.

In the zoom lens according to the embodiment, it is preferred that the fourth lens unit be oscillated along the direction of the optical axis in an in-focus state, and when the distance to an object changes, the fourth lens unit be moved for focusing by a distance larger than the amplitude of the oscillation.

In video shooting, it is necessary to perform focusing ceaselessly to keep the object in focus. In one method of keeping the in-focus state, the focusing lens unit is continuously oscillated by small amplitude along the direction of the optical axis about the in-focus position. This oscillation by small amplitude is called wobbling. Changes in the contrast of the image can be measured by wobbling, and changes in the in-focus state (whether or not the object is in focus) can be detected by changes in the contrast. If it is determined that the object is not in focus (out of focus), the in-focus state can be restored again by appropriately moving the focusing lens unit.

While the speed of operation (oscillation) in wobbling varies with the frame rate of the image pickup apparatus, very high-speed operation is needed in any case. The fourth lens unit can be designed to be smaller and lighter in weight as compared to the other lens units. Therefore, oscillating the fourth lens unit along the direction of the optical axis is preferable for appropriate driving control in wobbling and reduction of driving noise generated with wobbling.

In the zoom lens according to the present invention, it is preferred that the third lens unit includes an aspheric lens surface.

Including an aspheric surface in the third lens unit helps correction of spherical aberration in the focal length range near the telephoto end.

In the zoom lens according to the embodiment, it is preferred that the following conditional expressions (2) and (3) be satisfied:

$$0.4<|f_2|/FB<1.5 \quad (2),$$

and $$0.5<f_3/FB<1.8 \quad (3),$$

where,
$f_2$ is the focal length of the second lens unit,
$f_3$ is the focal length of the third lens unit,
FB is the equivalent air distance from the image side surface of the lens closest to the image side among the lenses in the zoom lens to the image plane.

Technical meaning of conditional expressions (2) and (3) has already been described.

In the zoom lens according to the embodiment, it is preferred that the following conditional expression (4) be satisfied:

$$1.0<|f_4|/f_w<5.0 \quad (4),$$

where,
$f_4$ is the focal length of the fourth lens unit, and
$f_w$ is the focal length of the entire zoom lens system at the wide angle end.

It is preferred that the refractive power of the fourth lens unit be so small by making so as not to fall below the lower limit of conditional expression (4). This makes correction of aberration easier. In consequence, this helps reduction of the number of lenses in the fourth lens unit. On the other hand, by making so as not to exceed the upper limit of conditional expression (4), the amount of movement of the fourth lens unit during focusing can be made small. This is advantageous for reduction of the size of the zoom lens and high speed focusing.

In the zoom lens according to the embodiment, it is preferred that the third lens unit consist of two sub lens units including an object side sub lens unit and an image side sub lens unit respectively arranged on the object side and on the image side with the largest axial space among the axial spaces in the third lens unit therebetween, and the object side sub lens unit and the image side sub lens unit have positive refractive powers.

In the zoom lens according to the embodiment, it is preferred that the third lens unit be divided into two sub lens units (the object side sub lens unit and the image side sub lens unit) by the largest axial space among the axial spaces between the adjacent lenses, and the refractive power of each of the sub lens units be positive. This arrangement allows excellent correction of spherical aberration and coma.

In the zoom lens according to the embodiment, it is preferred that the following conditional expressions (5), (6), and (7) be satisfied:

$$1.4 < D_3/f_w < 2.1 \quad (5),$$

$$0.11 < d_{(A)}/D_3 < 0.5 \quad (6),$$

and $$0.5 < f_{3f}/f_{3r} < 2.3 \quad (7),$$

where, $f_w$ is the focal length of the entire zoom lens system at the wide angle end, $D_3$ is the axial thickness of the third lens unit, $d_{(A)}$ is the axial distance between the object side sub lens unit and the image side sub lens unit, $f_{3f}$ is the focal length of the object side sub lens unit, and $f_{3r}$ is the focal length of the image side sub lens unit.

Satisfying conditional expressions (5), (6), and (7) contributes to the compatibility of correction of spherical aberration and correction of coma in the third lens unit.

By making so as not to fall below the lower limit of conditional expression (5), the thickness of the third lens unit is secured appropriately. This helps to secure correction function for coma in the image side sub lens unit sufficiently. On the other hand, by making so as not to exceed the upper limit of conditional expression (5), the thickness of the third lens unit on the optical axis can be prevented from becoming so large. This leads to reduction in the size of the zoom lens.

By making so as not to fall below the lower limit of conditional expression (6), an appropriately large distance can be left between the object side sub lens unit and the image side sub lens unit. This helps the image side sub lens unit to sufficiently correct coma and leads to reduction in the weight of the third lens unit. On the other hand, by making so as not to exceed the upper limit of conditional expression (6), the thickness of the third lens unit on the optical axis can be prevented from becoming so large. This leads to reduction in the size of the zoom lens.

The object side sub lens unit and the image side sub lens unit both contribute to the positive refractive power of the third lens unit, and conditional expression (7) specifies a preferred distribution of positive refractive powers among them. If conditional expression (7) is satisfied, deterioration in the optical performance that may be caused by decentering (if it exists) of the third lens unit can be reduced (or prevented).

By making so as not to fall below the lower limit of conditional expression (7), the positive refractive power of the object side sub lens unit becomes not too large. This helps reduction of aberration generated in the object side lens unit and prevents an increase in the number of lenses. Therefore, this is favorable for reduction in the size and cost of the zoom lens. On the other hand, by making so as not to exceed the upper limit of conditional expression (7), the positive refractive power of the object side sub lens unit is secured appropriately. This helps to secure ray converging effect in the object side sub lens unit sufficiently and reduction of aberrations generated in the image side sub lens unit easily. Therefore, this leads to reduction in the size of the image side sub lens unit and the size of the fourth lens unit and is advantageous for reduction of the thickness of the third lens unit and the number of lenses.

In the zoom lens according to the embodiment, the lens surface located closest to the object side among the lens surfaces in the third lens unit and the lens surface located closest to the image side among the lens surfaces in the third lens unit be both aspheric.

Because the refractive power of the second lens unit is negative, axial pencil of rays exiting from the second lens unit are divergent pencil of rays, which enter the third lens unit. Consequently, the diameter of axial pencil of rays is large in the object side sub lens unit of the third lens unit. Therefore, it is favorable for correction of spherical aberration that the lens surface located closest to the object side among the lens surfaces in the third lens unit, i.e. the object side surface of the object side sub lens unit, is aspheric.

On the other hand, axial pencil of rays and off-axis pencil of rays exiting from the object side sub lens unit are separated from each other and enter the image side sub lens unit. Consequently, the center of axial pencil of rays and the center of off-axis pencil of rays are separated appropriately in the image side sub lens unit. Therefore, it is favorable for correction of coma that the lens surface located closest to the image side among the lens surfaces in the third lens unit, i.e. the image side surface of the image side sub lens unit, is aspheric.

In the zoom lens according to the embodiment, it is preferred that the third lens unit consist, in order from the object side to the image side, of a first positive lens component, a second positive lens component, and a cemented lens component made up of a negative lens and a positive lens arranged in order from the object side or of a first positive lens component, a cemented lens component made up of a positive lens and a negative lens arranged in order from the object side, and a second positive lens component. Here, the term "lens component" refers to a lens block whose surfaces that are in contact with air on the optical axis are only its object side surface and its image side surface.

This configuration is favorable for compatibility of size reduction and high optical imaging performance of the zoom lens. Specific examples of lens components include single lenses and hybrid lenses such as cemented lenses.

In the zoom lens according to the embodiment, it is preferred that the first lens unit comprise a negative lens, and the following conditional expression (8) be satisfied:

$$15 < v_{1n} < 30 \quad (8),$$

where, $v_{1n}$ is the Abbe constant of the negative lens in the first lens unit with respect to the d-line or the largest Abbe constant among the Abbe constants of negative lenses included in the first lens unit if the first lens unit includes two or more negative lenses.

Conditional expression (8) is a preferable conditional expression for excellent correction of chromatic aberration of magnification in the focal length range near the wide angle end.

By making so as not to fall below the lower limit of conditional expression (8), a commonly available material can be used. Using a commonly available material is preferable for cost reduction. On the other hand, not exceeding the upper limit of conditional expression (8) is advantageous for correction of chromatic aberration of magnification at short wavelengths in the focal length range near the wide angle end.

In the zoom lens according to the embodiment, it is preferred that the second lens unit comprise a positive lens, and the following conditional expression (9) be satisfied:

$$1.70 < n_{2p} < 2.15 \quad (9),$$

where, $n_{2p}$ is the refractive index of the positive lens in the second lens unit with respect to the d-line or the largest refractive index among the refractive indexes of positive lenses included in the second lens unit if the second lens unit includes two or more positive lenses.

Conditional expression (9) is favorable conditional expression to keep the Petzval sum appropriately (for the Petzval sum to have an appropriate value). To this end, it is desirable that the second lens unit includes a positive lens and the positive lens is made of a material having a high refractive index.

By making so as not to fall below the lower limit of conditional expression (9), high refractive index is secured. This is favorable for reduction of curvature of field and improvement in the imaging performance in the high image height region. In consequence, when an image of an object is picked up by an image pickup element or the like, this is favorable for improvement in the image quality in the region near the periphery of the image. On the other hand, by making so as not to exceed the upper limit of conditional expression (9), a commonly available material can be used. Using a commonly available material is preferable for cost reduction.

In the zoom lens according to the embodiment, it is preferred that the following conditional expressions (10) and (11) be satisfied:

$$0.5 < |f_2|/i_h < 1.9 \quad (10),$$

and $$0.7 < f_3/i_h < 2.5 \quad (11),$$

where, $f_2$ is the focal length of the second lens unit, $f_3$ is the focal length of the third lens unit, and $i_h$ is the largest image height in the entire zoom lens system.

Technical meaning of conditional expressions (10) and (11) has already been described.

In the zoom lens according to the embodiment, it is preferred that the following conditional expressions (12), (13), and (14) be satisfied:

$$1.7 < Fno_{(w)} < 3.4 \quad (12),$$

$$2.3 < Fno_{(t)} < 4.3 \quad (13),$$

and $$2.7 < f_t/f_w < 7.0 \quad (14),$$

where, $Fno_{(w)}$ is the smallest value of the F-number of the entire zoom lens system at the wide angle end, $Fno_{(t)}$ is the smallest value of the F-number of the entire zoom lens system at the telephoto end, $f_w$ is the focal length of the entire zoom lens system at the wide angle end, and $f_t$ is the focal length of the entire zoom lens system at the telephoto end.

Not falling below the respective lower limits of conditional expression (12) and (13) and not exceeding the upper limit of conditional expression (14) is advantageous for reduction in the size of the zoom lens. On the other hand, not exceeding the upper limits of conditional expressions (12) and (13) is advantageous for obtaining bright images of objects in dark places. Therefore, they are favorable in reducing noises contained in an image, when an image of an object in a dark place is picked up by an image pickup element or the like. It is also preferable that the zoom ratio is so high by making so as not to fall below the lower limit of conditional expression (14). This makes the zoom lens useful in various shooting situations (namely, the zoom lens can be used for shooting various scenes).

In the zoom lens according to the embodiment, it is preferred that the following conditional expression (15) be satisfied:

$$0.9 < f_w/i_h < 1.5 \quad (15),$$

where, $f_w$ is the focal length of the entire zoom lens system at the wide angle end, and $i_h$ is the largest image height in the entire zoom lens system.

By making so as not to fall below the lower limit of conditional expression (15) and not to exceed the upper limit, the zoom lens can be designed to be capable of shooting images at wide angles of view with small off-axis aberrations such as distortion.

An image pickup apparatus according to an embodiment comprises a zoom lens according to any one of the above-described modes and an image pickup element arranged on the image side of the zoom lens to convert an image formed by the zoom lens into an electrical signal.

Thus, there can be provided an image pickup apparatus in which the magnitude of operation noise generated during zooming and focusing is low, and that is small in size, has excellent optical performance, and can generate images with low noise when the images are picked up in dark place.

The features described in the foregoing may be adopted in combination individually. Conditional expressions may be adopted individually.

It is preferred that the upper and/or lower limit values in the conditional expressions presented in the foregoing be further limited as follows in order that the advantages can be enjoyed more surely.

In conditional expression (1), it is more preferred that the lower limit value be 75, still more preferably 77, still more preferably 80, and the upper limit value be 100, still more preferably 90.

In conditional expression (2), it is more preferred that the lower limit value be 0.55, still more preferably 0.7, and the upper limit value be 1.3, still more preferably 1.2.

In conditional expression (3), it is more preferred that the lower limit value be 0.8, still more preferably 1.1, and the upper limit value be 1.7, still more preferably 1.6.

In conditional expression (4), it is more preferred that the lower limit value be 1.3, still more preferably 1.6, and the upper limit value be 4.5.

In conditional expression (5), it is more preferred that the lower limit value be 1.5, still more preferably 1.6, and the upper limit value be 2.0.

In conditional expression (6), it is more preferred that the lower limit value be 0.13, and the upper limit value be 0.45.

In conditional expression (7), it is more preferred that the lower limit value be 0.6, and the upper limit value be 2.0, still more preferably 1.7.

In conditional expression (8), it is more preferred that the lower limit value be 18, and the upper limit value be 28, still more preferably 26.

In conditional expression (9), it is more preferred that the lower limit value be 1.75, and the upper limit value be 2.1.

In conditional expression (10), it is more preferred that the lower limit value be 0.8, still more preferably 1.0, and the upper limit value be 1.7, still more preferably 1.6.

In conditional expression (11), it is more preferred that the lower limit value be 1.1, still more preferably 1.5, and the upper limit value be 2.3, still more preferably 2.1.

In conditional expression (12), it is more preferred that the lower limit value be 1.9, still more preferably 2.3, and the upper limit value be 3.2, still more preferably 3.0.

In conditional expression (13), it is more preferred that the lower limit value be 2.7, and the upper limit value be 4.1, still more preferably 3.6.

In conditional expression (14), it is more preferred that the lower limit value be 3.0, and the upper limit value be 6.0, still more preferably 5.0.

In conditional expression (15), it is more preferred that the lower limit value be 1.0, still more preferably 1.1, and the upper limit value be 1.3.

In the zoom lens and the image pickup apparatus described in the foregoing, two or more features may be adopted in combination. This is preferable in achieving a zoom lens and image pickup apparatus having excellent optical performance. Combinations of preferable features may be selected as desired. Referring to above-described further limitations of the conditional expressions, the limitation may be applied to only one of the lower and upper limits in each conditional expression.

In the following, examples of the zoom lens according to the present invention will be described in detail with reference to the drawings. It should be understood that the present invention is by no means limited by the examples.

The zoom lenses according to the following examples are standard zoom lenses, in particular large-diameter, high-performance standard zoom lenses that are most suitable for use in interchangeable lens systems.

Each of the zoom lenses according to first to seventh examples has a wide angle view equivalent to a focal length of 24 mm in the 135 format and an F-number of 2.8 at the wide angle end of the focal length range. The zoom lenses according to the first to sixth examples have an F-number of 2.8 also at the telephoto end. The zoom lenses according to all the examples have excellent optical performance with well-corrected off-axis aberrations in the focal length range near the wide angle end and well-corrected axial aberrations in the focal length range near the telephoto end.

In the following, zoom lenses according to the first to seventh examples will be described. FIGS. 1A, 1B, and 1C to 7A, 7B, and 7C are cross sectional views of the zoom lenses according to the first to seventh embodiments. FIGS. 1A to 7A are cross sectional views of the zoom lenses at the wide angle end, FIGS. 1B to 7B are cross sectional views of the zoom lenses in an intermediate focal length state, and FIGS. 1C to 7C are cross sectional views of the zoom lenses at the telephoto end. All of FIGS. 1A, 1B, and 1C to 7A, 7B, and 7C show the states in which the zoom lenses are focused on an object point at infinity.

In the cross sectional views, a first lens unit is denoted by G1, a second lens unit is denoted by G2, an aperture stop is denoted by S, a third lens unit is denoted by G3, a fourth lens unit is denoted by G4, a fifth lens unit is denoted by G5, a plane parallel plate constituting a cover glass for an electronic image pickup element is denoted by C, and the image plane is denoted by I. Multi-layer coating for wavelength restriction may be applied to the surface of the cover glass C. The cover glass C may be adapted to have a low pass filtering function.

In all the examples, the zoom lens includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3 (specifically, in the neighborhood of the object side surface of the third lens unit G3).

In all the examples, during zooming from the wide angle end to the telephoto end, the distance between the first lens unit G1 and the second lens unit G2 increases, and the distance between the second lens unit G2 and the third lens unit G3 decreases. In the second and seventh examples, the distance between the third lens unit G3 and the fourth lens unit G4 first increases and thereafter decreases. In the other examples, the distance between the third lens unit G3 and the fourth lens unit G4 increases. In all the examples, the distance between the fourth lens unit G4 and the fifth lens unit increases.

In all the examples, the focusing scheme is internal focusing, and wobbling and focusing is performed by moving the fourth lens unit G4. The fourth lens unit G4 is light in weight, and focusing from an object point at infinity to an object point at a short distance is performed by moving the fourth lens unit G4 toward the image side in all the examples. By moving the fourth lens unit G4, which is light in weight, reduction of operation noise and quick focusing are achieved.

Figure 1B:
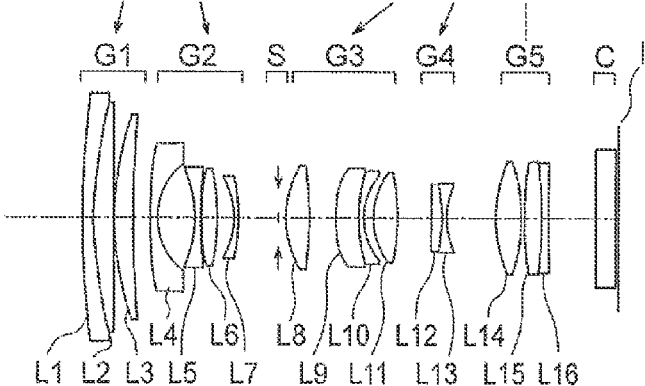
Figure 1C:
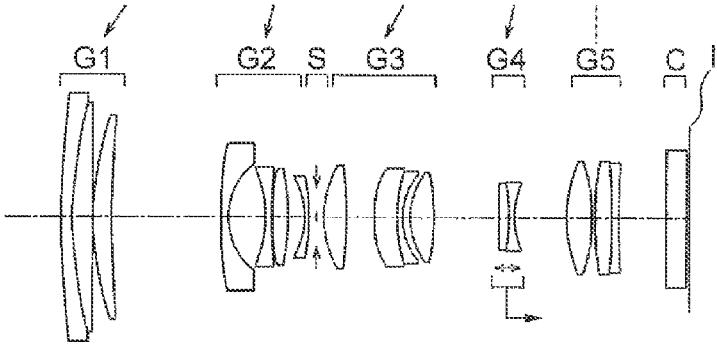

FIGS. 1A, 1B, and 1C show the zoom lens according to the first example. The first lens unit G1 is composed of a negative meniscus lens L1 having a convex surface directed toward the object side, a plano-convex positive lens L2, and a positive meniscus lens L3 having a convex surface directed toward the object side. The negative meniscus lens L1 and the plano-convex positive lens L2 are cemented together.

The second lens unit G2 is composed of a negative meniscus lens L4 having a convex surface directed toward the object side, a biconcave negative lens L5, a biconvex positive lens L6, and a negative meniscus lens L7 having a convex surface directed toward the image side.

The third lens unit G3 is composed of a biconvex positive lens L8, a positive meniscus lens L9 having a convex surface directed toward the object side, a negative meniscus lens L10 having a convex surface directed toward the object side, and a biconvex positive lens L11. The positive meniscus lens L9 and the negative meniscus lens L10 are cemented together.

The fourth lens unit G4 is composed of a positive meniscus lens L12 having a convex surface directed toward the image side and a biconcave negative lens L13. The positive meniscus lens L12 and the biconcave negative lens L13 are cemented together.

The fifth lens unit G5 is composed of a biconvex positive lens L14, a biconvex positive lens L15, and a biconcave negative lens L16. The biconvex positive lens L15 and the biconcave negative lens L16 are cemented together.

There are six aspheric surfaces, which include both surfaces of the negative meniscus lens L4, both surfaces of the biconvex positive lens L8, and both surfaces of the biconvex positive lens L11.

During zooming from the wide angle end to the telephoto end, the first lens unit G1 moves toward the object side, the second lens unit G2 moves first toward the image side and thereafter toward the object side, the third lens unit G3 and the fourth lens unit G4 move toward the object side, and the fifth lens unit G5 is fixed (stationary) relative to the image plane.

During focusing from an object at infinity to an object at a short distance, the fourth lens unit G4 moves along the optical axis toward the image side. The other lens units are stationary during focusing.

In the following description of the second to seventh examples, the expression "during zooming" shall mean "during zooming from the wide angle end to the telephoto end", and the expression "during focusing" shall mean "during focusing from an object at infinity to an object at a short distance".

Figure 2A:
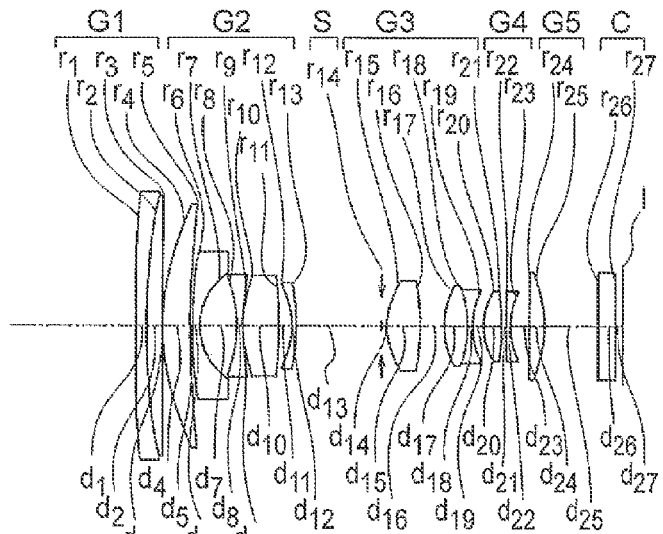
FIGS. 2A, 2B, and 2C are cross sectional views of a zoom lens according to a second example of the present invention in the state in which the zoom lens is focused on an object point at infinity, where
Figure 2B:
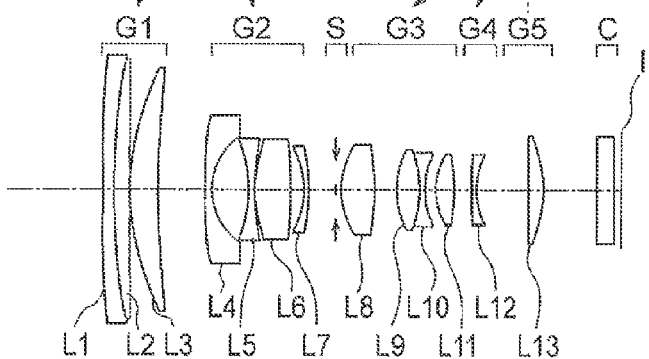
Figure 2C:
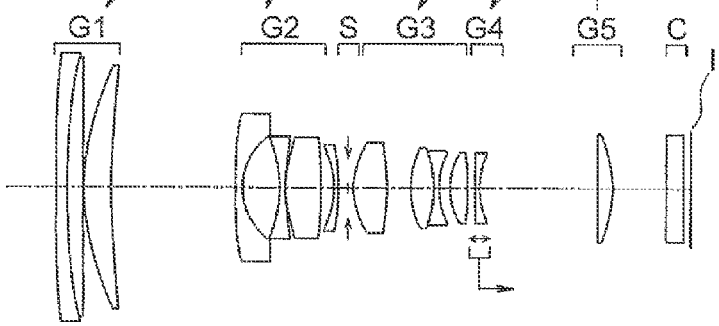

FIGS. 2A, 2B, and 2C show the zoom lens according to the second example. What is different in the zoom lens according to the second example from the zoom lens according to the first example is as follows.

In the first lens unit G1, the lens L2 is a positive meniscus lens having a convex surface directed toward the object side.

The construction of the second lens unit G2 is no difference.

In the third lens unit G3, the lens L9 is a biconvex positive lens, and the lens L10 is a biconcave negative lens.

The fourth lens unit G4 is composed only of a negative meniscus lens L12 having a convex surface directed toward the object side.

The fifth lens unit G5 is composed only of a plano-convex positive lens L13.

Aspheric surfaces are used in the lenses same as those in the zoom lens according to the first example.

The ways of movement of the lens units during zooming and focusing are the same as those in the zoom lens according to the first example.

Figure 3A:
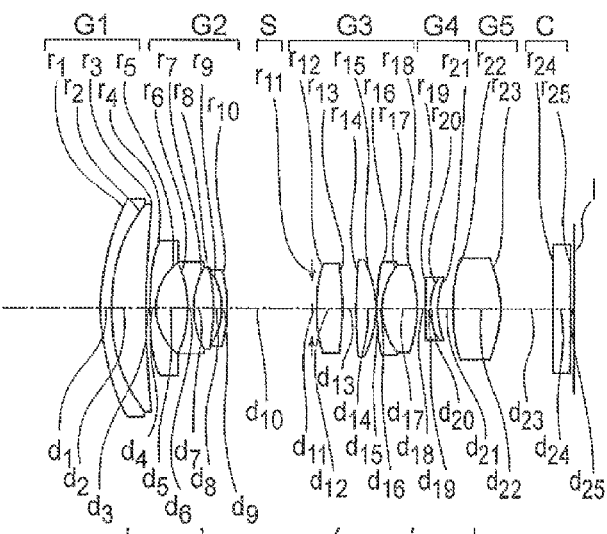
FIGS. 3A, 3B, and 3C are cross sectional views of a zoom lens according to a third example of the present invention in the state in which the zoom lens is focused on an object point at infinity, where
Figure 3B:
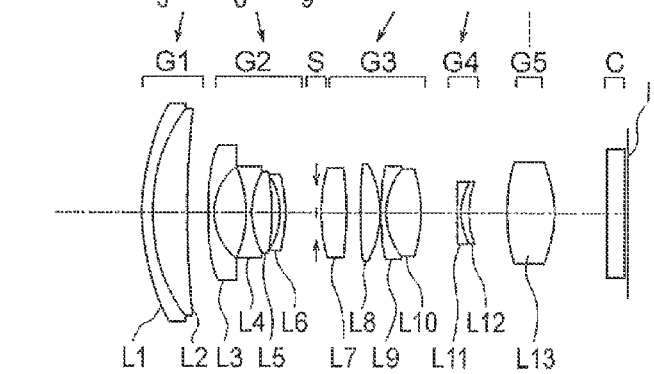
Figure 3C:
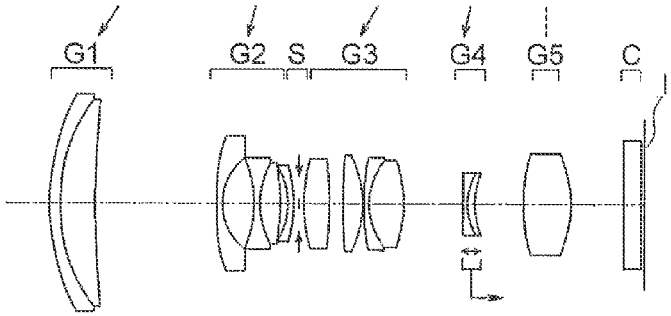

FIGS. 3A, 3B, and 3C show the zoom lens according to the third example. The first lens unit G1 is composed of a negative meniscus lens L1 having a convex surface directed toward the object side and a positive meniscus lens L2 having a convex surface directed toward the object side. The negative meniscus lens L1 and the positive meniscus lens L2 are cemented together.

The second lens unit G2 is composed of a negative meniscus lens L3 having a convex surface directed toward the object side, a biconcave negative lens L4, a biconvex positive lens L5, and a negative meniscus lens L6 having a convex surface directed toward the image side. The biconcave negative lens L4 and the biconvex positive lens L5 are cemented together.

The third lens unit G3 is composed of a biconvex positive lens L7, a biconvex positive lens L8, a negative meniscus lens L9 having a convex surface directed toward the object side, and a biconvex positive lens L10. The negative meniscus lens L9 and the biconvex positive lens L10 are cemented together.

The fourth lens unit G4 is composed of a negative meniscus lens L11 having a convex surface directed toward the object side and a positive meniscus lens L12 having a convex surface directed toward the object side. The negative meniscus lens L11 and the positive meniscus lens L12 are cemented together.

The fifth lens unit G5 is composed of a biconvex positive lens L13.

There are six aspheric surfaces, which include both surfaces of the negative meniscus lens L3, both surfaces of the biconvex positive lens L7, the image side surface of the biconvex positive lens L10, and the object side surface of the negative meniscus lens L11.

The ways of movement of the lens units during zooming and focusing are the same as those in the zoom lens according to the first example.

Figure 4A:
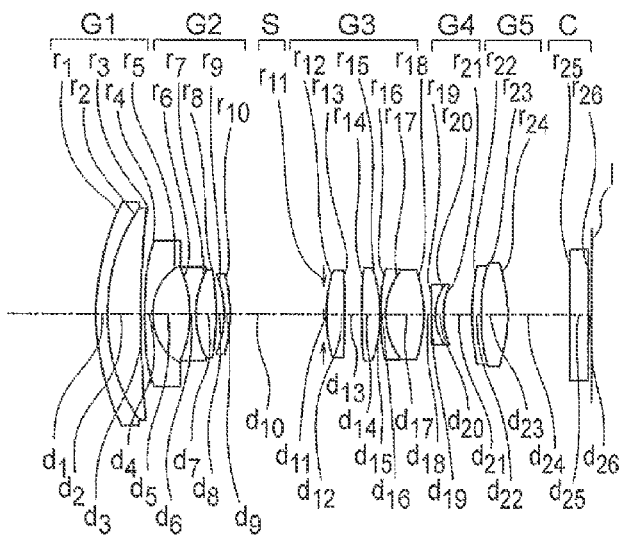
FIGS. 4A, 4B, and 4C are cross sectional views of a zoom lens according to a fourth example of the present invention in the state in which the zoom lens is focused on an object point at infinity, where
Figure 4B:
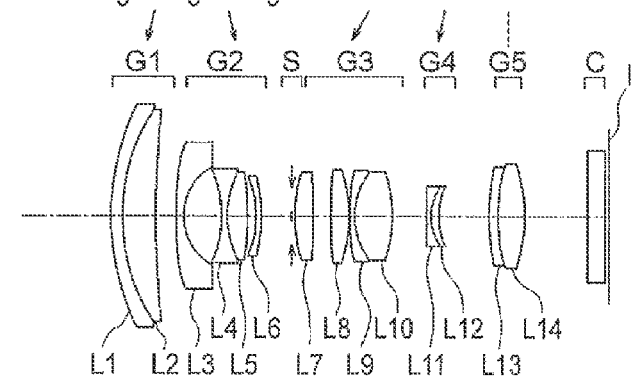
Figure 4C:
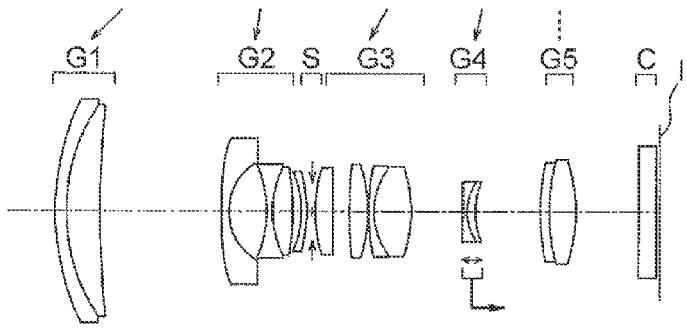

FIGS. 4A, 4B, and 4C show the zoom lens according to the fourth example. What is different in the zoom lens according to the fourth example from the zoom lens according to the third example is as follows.

The constructions of the first lens unit G1, the second lens unit G2, the third lens unit G3, and the fourth lens unit G4 are no difference.

The fifth lens unit G5 is composed of a negative meniscus lens L13 having a convex surface directed toward the object side and a biconvex positive lens L14. The negative meniscus lens L13 and the biconvex positive lens L14 are cemented together.

Aspheric surfaces are used in the lenses same as those in the zoom lens according to the third example.

The ways of movement of the lens units during zooming and focusing are the same as those in the zoom lens according to the first example.

Figure 5A:
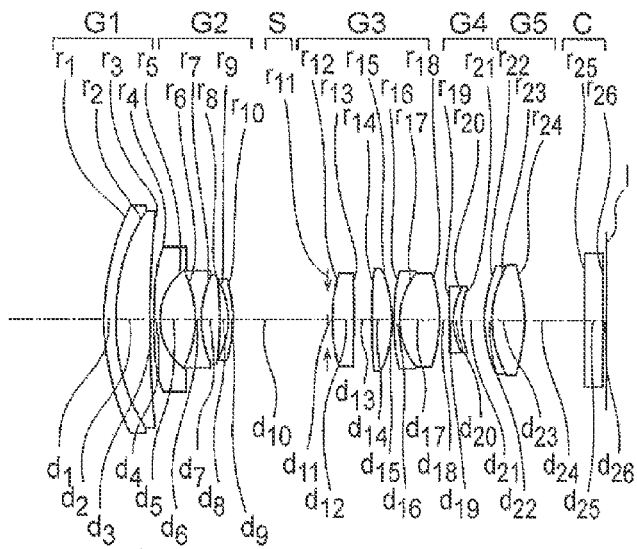
FIGS. 5A, 5B, and 5C are cross sectional views of a zoom lens according to a fifth example of the present invention in the state in which the zoom lens is focused on an object point at infinity, where
Figure 5B:
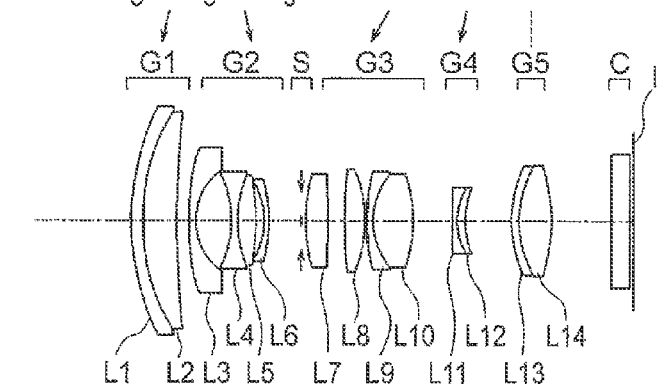
Figure 5C:
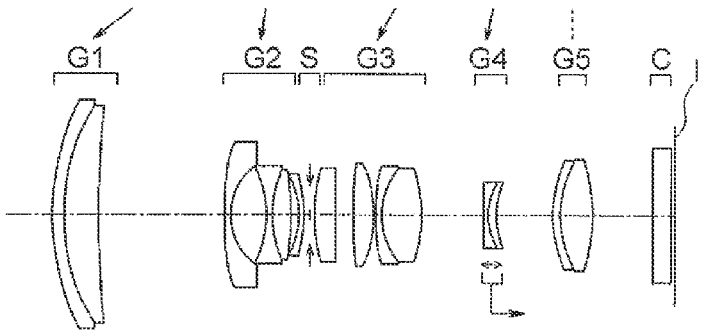

FIGS. 5A, 5B, and 5C show the zoom lens according to the fifth example. The constructions of the lens units are the same as those in the zoom lens according to the fourth example.

Aspheric surfaces are used in the lenses same as those in the zoom lens according to the fourth example.

The ways of movement of the lens units during zooming and focusing are the same as those in the zoom lens according to the first example.

Figure 6A:
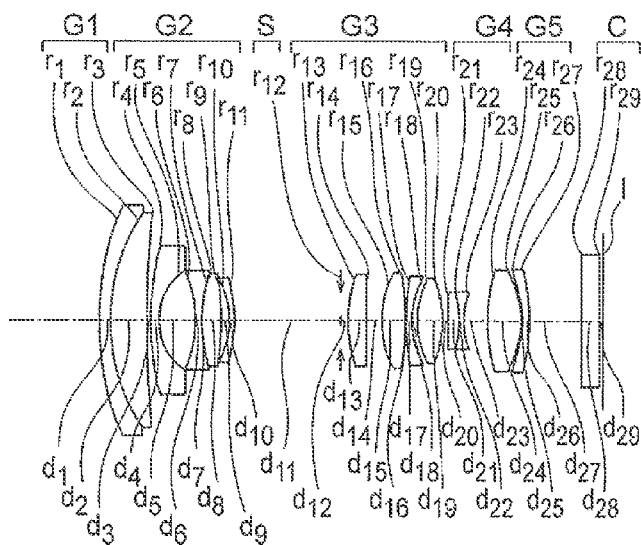
FIGS. 6A, 6B, and 6C are cross sectional views of a zoom lens according to a sixth example of the present invention in the state in which the zoom lens is focused on an object point at infinity, where
Figure 6B:
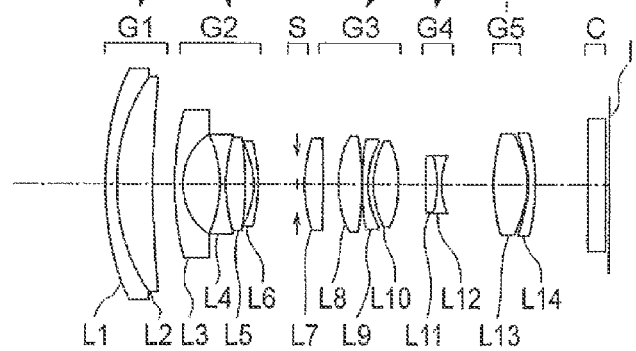
Figure 6C:
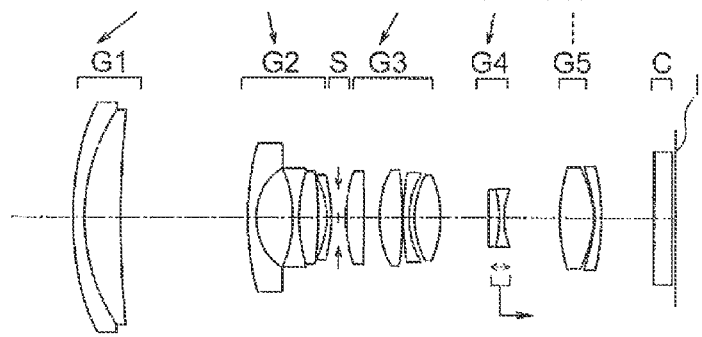

FIGS. 6A, 6B, and 6C show the zoom lens according to the sixth example. What is different in the zoom lens according to the sixth example from the zoom lens according to the third example is as follows.

The construction of the first lens unit G1 is no difference.

In the second lens unit G2, the biconcave negative lens L4 and the biconvex positive lens L5 are not cemented together.

In the third lens unit G3, the negative meniscus lens L9 and the biconvex positive lens L10 are not cemented together.

The fourth lens unit G4 is composed of a positive meniscus lens L11 having a convex surface directed toward the image side and a biconcave negative lens L12.

The fifth lens unit G5 is composed of a biconvex positive lens L13 and a negative meniscus lens L14 having a convex surface directed toward the image side.

There are seven aspheric surfaces, which include both surfaces of the negative meniscus lens L3, both surfaces of the biconvex positive lens L7, both surfaces of the biconvex positive lens L10, and the image side surface of the biconcave negative lens L12.

The ways of movement of the lens units during zooming and focusing are the same as those in the zoom lens according to the first example.

Figure 7A:
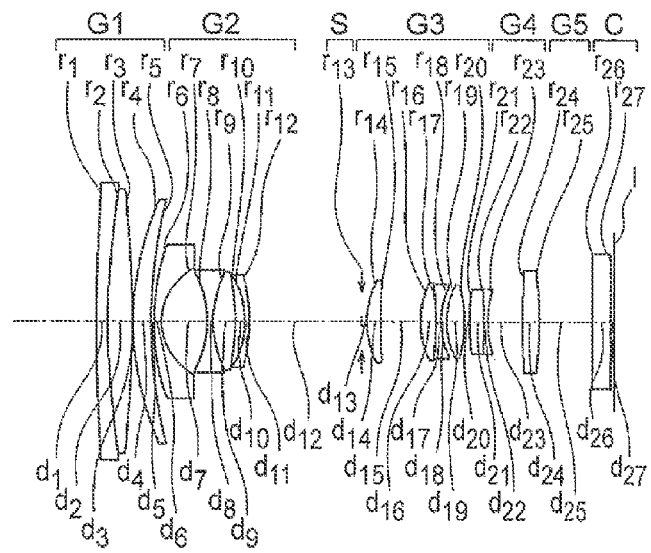
FIGS. 7A, 7B, and 7C are cross sectional views of a zoom lens according to a seventh example of the present invention in the state in which the zoom lens is focused on an object point at infinity, where
Figure 7B:
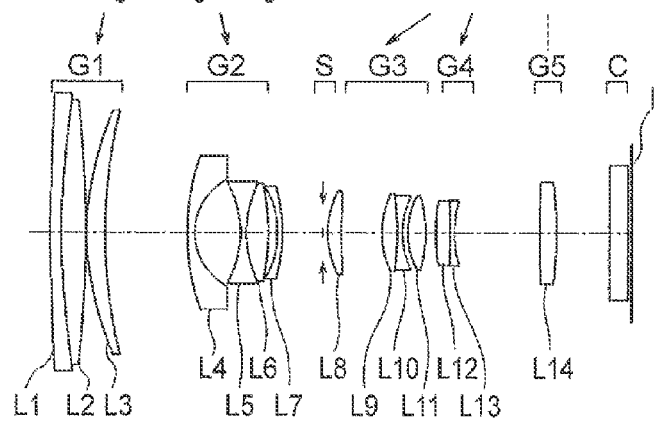
Figure 7C:
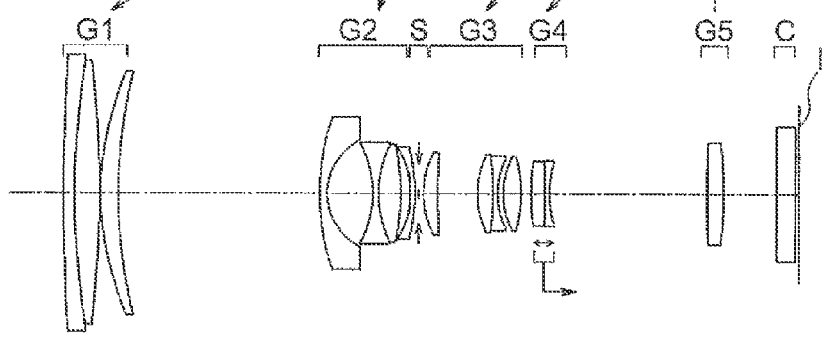

FIGS. 7A, 7B, and 7C show the zoom lens according to the seventh example. What is different in the zoom lens according to the seventh example from the zoom lens according to the first example is as follows.

In the first lens unit G1, the lens L2 is a biconvex positive lens.

In the second lens unit G2, the biconcave negative lens L5 and the biconvex positive lens L6 are cemented together.

In the third lens unit G3, the lens L8 is a positive meniscus lens having a convex surface directed toward the object side, the lens L9 is a biconvex positive lens, and the lens L10 is a biconcave negative lens.

In the fourth lens unit G4, the lens L12 is a biconvex positive lens.

The fifth lens unit G5 is composed only of a biconvex positive lens L14.

There are six aspheric surfaces, which include both surfaces of the negative meniscus lens L4, both surfaces of the positive meniscus lens L8, and both surfaces of the biconvex positive lens L11.

The ways of movement of the lens units during zooming and focusing are the same as those in the zoom lens according to the first example.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe constant for each lens and * denotes an aspheric surface. Further, wide denotes a wide angle end, standard denotes an intermediate focal length state, tele denotes a telephoto end, Focal length denotes a focal length of the entire system, FNO. denotes an F number, ω denotes a half angle of view, IH denotes an image height, FB denotes a back focus, Lens total length is a distance from a lens forefront surface up to a lens backmost surface plus BF (back focus) and each of f1, f2 . . . is a focal length of each lens unit. Further, FB is a unit which is expressed upon air conversion of a distance from the lens backmost surface to a paraxial image surface.

Focus data given below is data in the case of focusing from an object point at infinity to an object point at a short distance, where the object point at a short distance refers to an object point for which the distance from the object point to the image point (i.e. object to image distance) is 0.25 meter.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'E-n' (where, n is an integral number) indicates '$10^{-n}$'. Moreover, these symbols are commonly used in the following numerical data for each example.

Example 1

Unit mm

Surface data

| Surface no. | r | d | nd | vd |
|---|---|---|---|---|
| Object plane | ∞ | ∞ | | |
| 1 | 182.0248 | 2.400 | 1.84666 | 23.78 |
| 2 | 87.8417 | 4.148 | 1.60311 | 60.64 |
| 3 | ∞ | 0.150 | | |
| 4 | 62.0596 | 3.883 | 1.72916 | 54.68 |
| 5 | 226.0435 | Variable | | |
| 6* | 298.9904 | 1.500 | 1.80610 | 40.88 |
| 7* | 14.4879 | 7.668 | | |
| 8 | −25.2722 | 1.200 | 1.77250 | 49.60 |
| 9 | 83.5456 | 0.150 | | |
| 10 | 50.7017 | 3.311 | 1.92286 | 20.88 |
| 11 | −47.3560 | 3.294 | | |
| 12 | −18.1882 | 1.100 | 1.48749 | 70.23 |
| 13 | −43.8608 | Variable | | |
| 14 (stop) | ∞ | 1.500 | | |
| 15* | 18.6553 | 4.964 | 1.49700 | 81.54 |
| 16* | −63.1764 | 5.244 | | |
| 17 | 21.7188 | 4.874 | 1.49700 | 81.54 |
| 18 | 32.4127 | 1.200 | 1.92286 | 20.88 |
| 19 | 14.7886 | 1.632 | | |
| 20* | 15.1321 | 4.859 | 1.58313 | 59.38 |
| 21* | −44.0345 | Variable | | |
| 22 | −262.2626 | 2.050 | 1.84666 | 23.78 |
| 23 | −33.0062 | 1.000 | 1.72916 | 54.68 |
| 24 | 17.1689 | Variable | | |
| 25 | 30.4652 | 5.280 | 1.49700 | 81.54 |
| 26 | −36.5007 | 0.363 | | |
| 27 | 71.3147 | 3.718 | 1.48749 | 70.23 |
| 28 | −130.4071 | 1.500 | 1.90200 | 25.10 |
| 29 | 228.5548 | 10.0027 | | |
| 30 | ∞ | 4.000 | 1.51633 | 64.14 |
| 31 | ∞ | 0.800 | | |
| Image plane (Image pickup surface) | ∞ | | | |

Unit mm

Aspherical surface data

6th surface k = 0
A4 = 1.5542E−05

7th surface k = 0.3199
A4 = −1.3902E−05, A6 = −3.7218E−08

15th surface k = −0.3560
A4 = −2.0358E−05, A6 = −8.8225E−09, A8 = −1.1013E−11

16th surface k = 0
A4 = −2.3426E−06

20th surface k = −0.4174
A4 = −2.0888E−05, A6 = 2.0485E−08, A8 = −3.0249E−11

21st surface k = 3.3450
A4 = 1.9632E−05

| | wide | standard | tele |
|---|---|---|---|
| Zoom data | | | |
| Focal length | 12.27 | 21.97 | 39.20 |
| Fno. | 2.88 | 2.88 | 2.88 |
| 2ω | 88.15° | 53.82° | 30.10° |
| IH | 10.820 | 10.820 | 10.820 |
| FB (in air) | 13.441 | 13.441 | 13.441 |
| Lens total length (in air) | 106.807 | 109.717 | 128.108 |
| d5 | 0.7947 | 4.0667 | 22.3141 |
| d13 | 21.1256 | 7.8959 | 1.5004 |
| d21 | 1.3500 | 7.3990 | 13.2829 |
| d24 | 3.1082 | 9.9266 | 10.5817 |
| Focus data | | | |
| direction of movement | image side | image side | image side |
| amount of movement | 0.590 | 1.587 | 4.761 |

Unit focal length f1 = 95.9581   f2 = −12.8397   f3 = 20.5948   f4 = −23.6581
f5 = 33.7708

Example 2

Unit mm

Surface data

| Surface no. | r | d | nd | vd |
|---|---|---|---|---|
| Object plane | ∞ | ∞ | | |
| 1 | 402.8290 | 2.000 | 1.92286 | 20.88 |
| 2 | 130.2921 | 3.535 | 1.72916 | 54.68 |
| 3 | 2906.2339 | 0.100 | | |
| 4 | 54.9970 | 5.798 | 1.77250 | 49.60 |
| 5 | 211.4953 | Variable | | |
| 6* | 171.3646 | 1.500 | 1.80610 | 40.88 |
| 7* | 12.4749 | 7.866 | | |
| 8 | −23.1820 | 1.000 | 1.59282 | 68.63 |
| 9 | 46.1881 | 0.100 | | |
| 10 | 31.2674 | 7.576 | 2.00069 | 25.46 |
| 11 | −80.2075 | 2.691 | | |
| 12 | −17.1747 | 1.000 | 1.48749 | 70.23 |
| 13 | −30.5038 | Variable | | |

-continued

Unit mm

| | | | | |
|---|---|---|---|---|
| 14(stop) | ∞ | 1.000 | | |
| 15* | 17.1223 | 6.927 | 1.49700 | 81.61 |
| 16* | −55.4253 | 4.917 | | |
| 17 | 18.4472 | 4.791 | 1.49700 | 81.54 |
| 18 | −25.8502 | 1.000 | 1.73800 | 32.26 |
| 19 | 16.2702 | 2.404 | | |
| 20* | 15.1109 | 3.626 | 1.58313 | 59.38 |
| 21* | −52.0293 | Variable | | |
| 22 | 161.0226 | 1.000 | 1.48749 | 70.23 |
| 23 | 17.1999 | Variable | | |
| 24 | ∞ | 3.083 | 1.63980 | 34.46 |
| 25 | −32.3340 | 11.2026 | | |
| 26 | ∞ | 4.000 | 1.51633 | 64.14 |
| 27 | ∞ | 0.800 | | |
| Image plane (Image pickup surface) | ∞ | | | |

Aspherical surface data

6th surface $k = 0$
$A4 = 6.3257E-06, A6 = 2.9586E-08, A8 = -1.3884E-10,$
$A10 = 2.3100E-13$ 7th surface $k = -0.2106$
$A4 = -4.2574E-06, A6 = 3.9977E-08, A8 = 6.3174E-10$ 15th surface $k = -0.2102$
$A4 = -1.7046E-05, A6 = -4.0879E-08, A8 = 6.3570E-11$ 16th surface $k = -0.8706$
$A4 = -1.9028E-07, A6 = -1.6238E-08, A8 = -3.0427E-10,$
$A10 = 2.5628E-12$ 20th surface $k = -0.0238$
$A4 = -2.9632E-05, A6 = 6.7538E-08, A8 = -1.0465E-10$ 21st surface $k = -7.4102$
$A4 = 4.5850E-05, A6 = 1.1735E-07$

| | wide | standard | tele |
|---|---|---|---|
| Zoom data | | | |
| Focal length | 12.25 | 22.46 | 39.15 |
| Fno. | 2.88 | 2.88 | 2.88 |
| 2ω | 89.52° | 50.87° | 30.19° |
| IH | 10.820 | 10.820 | 10.820 |
| FB (in air) | 14.641 | 14.641 | 14.641 |
| Lens total length (in air) | 99.764 | 106.101 | 130.240 |
| d5 | 0.6563 | 9.9959 | 25.8169 |
| d13 | 17.6712 | 5.2811 | 2.0748 |
| d21 | 0.9257 | 3.5932 | 1.3369 |
| d23 | 3.9564 | 10.6765 | 24.4563 |
| Focus data | | | |
| direction of movement | image side | image side | image side |
| amount of movement | 0.988 | 2.458 | 4.505 |

Unit focal length $f1 = 90.2294 \quad f2 = -14.7477 \quad f3 = 20.8166 \quad f4 = -39.5923$
$f5 = 50.5378$ Example 3

Unit mm

Surface data

| Surface no. | r | d | nd | vd |
|---|---|---|---|---|
| Object plane | ∞ | ∞ | | |
| 1 | 51.8336 | 2.400 | 1.80518 | 25.42 |
| 2 | 39.6462 | 7.714 | 1.61800 | 63.33 |
| 3 | 219.9591 | Variable | | |
| 4* | 122.4799 | 1.500 | 1.74320 | 49.29 |
| 5* | 12.4496 | 6.938 | | |
| 6 | −24.3734 | 1.200 | 1.49700 | 81.54 |
| 7 | 19.5116 | 4.355 | 1.75520 | 27.51 |
| 8 | −69.6015 | 1.882 | | |
| 9 | −16.7022 | 1.100 | 1.77250 | 49.60 |
| 10 | −32.0865 | Variable | | |
| 11(stop) | ∞ | 1.000 | | |
| 12* | 29.9777 | 5.816 | 1.58313 | 59.38 |
| 13* | −67.2459 | 3.114 | | |
| 14 | 130.6893 | 4.356 | 1.49700 | 81.54 |
| 15 | −23.9362 | 0.063 | | |
| 16 | 51.3215 | 1.200 | 1.80518 | 25.42 |
| 17 | 16.5023 | 7.777 | 1.49700 | 81.54 |
| 18* | −29.9311 | Variable | | |
| 19* | 190.4001 | 0.920 | 1.80610 | 40.88 |
| 20 | 13.1575 | 1.671 | 2.00272 | 19.32 |
| 21 | 17.0245 | Variable | | |
| 22 | 41.9268 | 10.493 | 1.48749 | 70.23 |
| 23 | −28.1005 | 11.8980 | | |
| 24 | ∞ | 4.000 | 1.51633 | 64.14 |
| 25 | ∞ | 0.800 | | |
| Image plane (Image pickup surface) | ∞ | | | |

Aspherical surface data

4th surface $k = -0.0694$
$A4 = 1.5465E-05, A6 = 9.0982E-08, A8 = -5.9141E-10,$
$A10 = 1.5216E-12$ 5th surface $k = 0.1785$
$A4 = -1.9529E-05, A6 = -5.1527E-08, A8 = 1.4863E-09,$
$A10 = -1.8662E-11$ 12th surface $k = -2.8742$
$A4 = -2.9944E-06, A6 = -9.5769E-09, A8 = -9.2746E-10,$
$A10 = 1.2290E-13$ 13th surface $k = 9.0052$
$A4 = 4.2067E-05, A6 = 5.9290E-09, A8 = -1.0964E-09,$
$A10 = 1.3267E-12$ 18th surface $k = -0.6700$
$A4 = -2.1380E-06, A6 = 1.6908E-08, A8 = 9.5909E-11,$
$A10 = -9.5791E-13$ 19th surface $k = 9.0261$
$A4 = -5.2267E-06, A6 = -6.1396E-08, A8 = 3.4378E-09,$
$A10 = -3.4511E-11$

| | wide | standard | tele |
|---|---|---|---|
| Zoom data | | | |
| Focal length | 12.25 | 21.89 | 39.12 |
| Fno. | 2.88 | 2.88 | 2.88 |

-continued

| Unit mm | | | |
|---|---|---|---|
| 2ω | 89.11° | 53.70° | 30.45° |
| IH | 10.820 | 10.820 | 10.820 |
| FB (in air) | 15.336 | 15.336 | 15.336 |
| Lens total length (in air) | 103.735 | 106.669 | 130.630 |
| d3 | 0.8001 | 4.8157 | 26.9627 |
| d10 | 18.8282 | 6.5905 | 1.0728 |
| d18 | 1.8543 | 7.6449 | 12.9554 |
| d21 | 3.4178 | 8.7826 | 10.8036 |

-continued

| Unit mm | | | |
|---|---|---|---|
| Focus data | | | |
| direction of movement | image side | image side | image side |
| amount of movement | 0.578 | 1.579 | 4.501 |
| Unit focal length | | | |
| f1 = 120.4132　　f2 = −12.4659　　f3 = 18.9430　　f4 = −25.8494 | | | |
| f5 = 36.2945 | | | |

Example 4

| Unit mm | | | | |
|---|---|---|---|---|
| Surface data | | | | |
| Surface no. | r | d | nd | vd |
| Object plane | ∞ | ∞ | | |
| 1 | 58.1051 | 2.400 | 1.92286 | 18.90 |
| 2 | 43.3094 | 7.144 | 1.78800 | 47.37 |
| 3 | 189.3460 | Variable | | |
| 4* | 196.1239 | 1.500 | 1.74320 | 49.29 |
| 5* | 12.5000 | 8.295 | | |
| 6 | −23.1998 | 1.200 | 1.49700 | 81.54 |
| 7 | 23.1732 | 4.491 | 1.84666 | 23.78 |
| 8 | −64.5591 | 1.555 | | |
| 9 | −22.5326 | 1.100 | 2.00069 | 25.46 |
| 10 | −42.2763 | Variable | | |
| 11(stop) | ∞ | 1.000 | | |
| 12* | 28.6099 | 3.896 | 1.58313 | 59.38 |
| 13* | −149.8082 | 3.530 | | |
| 14 | 75.1445 | 4.091 | 1.49700 | 81.54 |
| 15 | −32.4822 | 0.150 | | |
| 16 | 43.0742 | 1.000 | 1.80518 | 25.42 |
| 17 | 16.0902 | 8.254 | 1.49700 | 81.54 |
| 18* | −25.9149 | Variable | | |
| 19* | 231.2549 | 0.920 | 1.80610 | 40.88 |
| 20 | 13.3156 | 1.736 | 1.94595 | 17.98 |
| 21 | 18.1030 | Variable | | |
| 22 | 59.1969 | 1.800 | 1.92286 | 18.90 |
| 23 | 40.2475 | 5.903 | 1.64000 | 60.08 |
| 24 | −33.2831 | 13.4609 | | |
| 25 | ∞ | 4.000 | 1.51633 | 64.14 |
| 26 | ∞ | 0.800 | | |
| Image plane | ∞ | | | |

(Image pickup surface)
Aspherical surface data
4th surface k = 0
A4 = 2.5174E−05, A6 = −4.1276E−08, A8 = −2.7763E−12, A10 = 1.5368E−13
5th surface k = 0.0466
A4 = −2.8486E−07, A6 = −4.2670E−08, A8 = 1.2852E−09, A10 = −1.1918E−11
12th surface k = −1.4129
A4 = −1.6864E−06, A6 = 5.9052E−08, A8 = −1.2963E−09, A10 = −1.7099E−12
13th surface k = 0
A4 = 3.2969E−05, A6 = 3.0465E−08, A8 = −1.2082E−09, A10 = −2.6665E−12
18th surface k = −1.1239
A4 = 4.4785E−06, A6 = 5.3666E−09, A8 = 3.0467E−11, A10 = 3.5774E−13
19th surface k = 0
A4 = −5.4311E−06, A6 = 2.4674E−08, A8 = 7.9285E−10, A10 = −6.3870E−12

-continued

| Unit mm | | | |
|---|---|---|---|
| Zoom data | wide | standard | tele |
| Focal length | 12.24 | 21.83 | 39.20 |
| Fno. | 2.88 | 2.88 | 2.88 |
| 2ω | 88.78° | 53.15° | 30.05° |
| IH | 10.820 | 10.820 | 10.820 |
| FB (in air) | 16.899 | 16.899 | 16.899 |
| Lens total length (in air) | 105.920 | 106.468 | 129.386 |
| d3 | 0.9821 | 5.0058 | 26.4528 |
| d10 | 20.3546 | 6.7140 | 1.0026 |
| d18 | 1.5000 | 7.1013 | 11.4467 |
| d21 | 6.2198 | 10.7835 | 13.6202 |
| Focus data | wide | standard | tele |
| direction of movement | image side | image side | image side |
| amount of movement | 0.571 | 1.578 | 4.414 |

Unit focal length f1 = 111.5496   f2 = −13.1125   f3 = 19.2725   f4 = −26.6384
f5 = 37.0194

Example 5

| Unit mm | | | | |
|---|---|---|---|---|
| Surface data | | | | |
| Surface no. | r | d | nd | vd |
| Object plane | ∞ | ∞ | | |
| 1 | 55.0572 | 2.400 | 1.92286 | 18.90 |
| 2 | 44.2744 | 7.101 | 1.69680 | 55.53 |
| 3 | 207.8490 | Variable | | |
| 4* | 159.5696 | 1.500 | 1.74320 | 49.29 |
| 5* | 12.8384 | 7.332 | | |
| 6 | −22.1355 | 1.200 | 1.49700 | 81.54 |
| 7 | 22.1355 | 4.241 | 1.75520 | 27.51 |
| 8 | −56.8950 | 1.807 | | |
| 9 | −16.7113 | 1.100 | 1.77250 | 49.60 |
| 10 | −29.9316 | Variable | | |
| 11(stop) | ∞ | 1.000 | | |
| 12* | 29.3834 | 4.596 | 1.58313 | 59.38 |
| 13* | −148.0986 | 3.530 | | |
| 14 | 91.1635 | 4.632 | 1.49700 | 81.54 |
| 15 | −24.2108 | 0.130 | | |
| 16 | 42.3361 | 1.200 | 1.80518 | 25.42 |
| 17 | 15.6885 | 8.296 | 1.49700 | 81.54 |
| 18* | −32.0641 | Variable | | |
| 19* | 573.6706 | 0.920 | 1.80610 | 40.88 |
| 20 | 12.8813 | 2.041 | 1.94595 | 17.98 |
| 21 | 17.2342 | Variable | | |
| 22 | 30.0105 | 1.395 | 2.00069 | 25.46 |
| 23 | 22.6466 | 7.173 | 1.58313 | 59.38 |
| 24 | −36.2011 | 12.5585 | | |
| 25 | ∞ | 4.000 | 1.51633 | 64.14 |
| 26 | ∞ | 0.800 | | |
| Image plane (Image pickup surface) | ∞ | | | |

Aspherical surface data

4th surface k = −9.0073
A4 = 1.7086E−05, A6 = 7.3258E−08, A8 = −5.0052E−10,
A10 = 1.3518E−12

5th surface k = 0.2022
A4 = −2.0814E−05, A6 = −1.0324E−07, A8 = 2.0273E−09,
A10 = −2.2396E−11

-continued

| Unit mm |
|---|

12th surface k = −2.1360
A4 = 7.7286E−07, A6 = −5.8809E−08, A8 = −8.1816E−10,
A10 = −3.2776E−12

13th surface k = 8.4339
A4 = 4.0121E−05, A6 = −3.1751E−08, A8 = −1.2712E−09,
A10 = −5.4995E−13

18th surface k = −0.7208
A4 = 5.6768E−07, A6 = 1.3061E−08, A8 = 1.1822E−11,
A10 = −1.1620E−14

19th surface k = 9.0337
A4 = −1.7254E−06, A6 = −4.0437E−08, A8 = 3.1029E−09,
A10 = −3.4898E−11

| | wide | standard | tele |
|---|---|---|---|
| Zoom data | | | |
| Focal length | 12.25 | 21.92 | 39.10 |
| Fno. | 2.88 | 2.88 | 2.88 |
| 2ω | 88.92° | 53.84° | 30.48° |
| IH | 10.820 | 10.820 | 10.820 |
| FB (in air) | 15.996 | 15.997 | 15.997 |
| Lens total length (in air) | 104.788 | 105.126 | 129.979 |
| d3 | 0.8433 | 3.1723 | 26.5044 |
| d10 | 19.7674 | 6.3586 | 1.0555 |
| d18 | 1.8876 | 8.2567 | 13.0735 |
| d21 | 4.6989 | 9.7482 | 11.7552 |
| Focus data | | | |
| direction of movement | image side | image side | image side |
| amount of movement | 0.557 | 1.565 | 4.431 |

Unit focal length f1 = 115.6677   f2 = −12.7584   f3 = 19.2934   f4 = −23.8727
f5 = 33.3897

Example 6

Unit mm

Surface data

| Surface no. | r | d | nd | vd |
|---|---|---|---|---|
| Object plane | ∞ | ∞ | | |
| 1 | 64.2450 | 2.400 | 1.84666 | 23.78 |
| 2 | 42.8118 | 7.785 | 1.77250 | 49.60 |
| 3 | 228.7714 | Variable | | |
| 4* | 136.5007 | 1.500 | 1.80610 | 40.92 |
| 5* | 13.5581 | 8.045 | | |
| 6 | −26.5143 | 1.200 | 1.49700 | 81.54 |
| 7 | 30.9005 | 0.150 | | |
| 8 | 28.8989 | 3.960 | 1.84666 | 23.78 |
| 9 | −116.0515 | 1.887 | | |
| 10 | −20.9956 | 1.100 | 1.72916 | 54.68 |
| 11 | −37.9263 | Variable | | |
| 12(stop) | ∞ | 1.500 | | |
| 13* | 29.9636 | 3.847 | 1.74320 | 49.29 |
| 14* | −221.6927 | 3.129 | | |
| 15 | 22.3875 | 4.889 | 1.49700 | 81.54 |
| 16 | −62.6960 | 0.150 | | |
| 17 | 68.0048 | 1.200 | 2.00069 | 25.46 |
| 18 | 17.4694 | 1.114 | | |
| 19* | 16.7440 | 5.603 | 1.49700 | 81.54 |
| 20* | −23.8855 | Variable | | |
| 21 | −505.4659 | 2.129 | 1.84666 | 23.78 |
| 22 | −25.5434 | 1.000 | 1.74320 | 49.29 |
| 23* | 15.7082 | Variable | | |
| 24 | 42.0268 | 7.068 | 1.64000 | 60.08 |
| 25 | −23.8254 | 0.150 | | |
| 26 | −29.7116 | 1.500 | 1.84666 | 23.78 |
| 27 | −57.3284 | 11.2628 | | |
| 28 | ∞ | 4.000 | 1.51633 | 64.14 |
| 29 | ∞ | 0.800 | | |
| Image plane (Image pickup surface) | ∞ | | | |

Aspherical surface data

4th surface k = −30.3282
A4 = 1.6412E−05, A6 = −1.5054E−08, A8 = 4.7817E−11,
A10 = 3.1917E−15

5th surface k = 0.2523
A4 = −1.5553E−05, A6 = −7.1448E−08, A8 = −6.9036E−11,
A10 = −4.4021E−12

13th surface k = −0.8439
A4 = −1.9810E−05, A6 = 1.3073E−07, A8 = −3.9374E−10

14th surface k = 0.0127
A4 = −1.0891E−05, A6 = 2.1774E−07, A8 = −6.3195E−10

19th surface k = −0.9724
A4 = −3.8175E−05, A6 = 2.2535E−07, A8 = −4.1137E−11

20th surface k = −0.3035
A4 = 2.5928E−06, A6 = 5.5275E−08, A8 = 3.9585E−10,
A10 = 0.0000E+00

23rd surface k = 0.1505
A4 = 1.6098E−06, A6 = −8.1488E−08, A8 = −9.6226E−11,
A10 = 0.0000E+00

Zoom data

| | wide | standard | tele |
|---|---|---|---|
| Focal length | 12.24 | 21.83 | 39.20 |
| Fno. | 2.88 | 2.88 | 2.88 |
| 2ω | 88.45° | 53.75° | 30.17° |
| IH | 10.820 | 10.820 | 10.820 |
| FB (in air) | 14.701 | 14.701 | 14.701 |
| Lens total length (in air) | 106.028 | 105.617 | 126.909 |
| d3 | 0.7889 | 4.3136 | 26.9760 |
| d11 | 22.7125 | 8.3799 | 1.4979 |
| d20 | 1.3500 | 5.7892 | 10.3350 |
| d23 | 5.1703 | 11.1275 | 12.0939 |

Focus data

| direction of movement | image side | image side | image side |
|---|---|---|---|
| amount of movement | 0.469 | 1.216 | 3.533 |

Unit focal length f1 = 120.0865  f2 = −13.6417  f3 = 18.6769  f4 = −22.2439
f5 = 36.4729

Example 7

Unit mm

Surface data

| Surface no. | r | d | nd | vd |
|---|---|---|---|---|
| Object plane | ∞ | ∞ | | |
| 1 | 500.0000 | 2.200 | 1.84666 | 23.78 |
| 2 | 160.0628 | 5.273 | 1.60311 | 60.64 |
| 3 | −270.6063 | 0.150 | | |
| 4 | 63.0833 | 3.813 | 1.77250 | 49.60 |
| 5 | 103.9750 | Variable | | |
| 6* | 56.2074 | 1.500 | 1.80610 | 40.88 |
| 7* | 11.8380 | 9.673 | | |
| 8 | −21.4816 | 1.300 | 1.59282 | 68.63 |
| 9 | 23.3531 | 4.697 | 1.90366 | 31.32 |
| 10 | −44.0463 | 1.890 | | |
| 11 | −18.9038 | 1.000 | 1.53172 | 48.84 |
| 12 | −36.7153 | Variable | | |
| 13(stop) | ∞ | 1.000 | | |
| 14* | 17.6239 | 2.926 | 1.58313 | 59.38 |
| 15* | 123.9330 | 8.450 | | |
| 16 | 18.3301 | 3.324 | 1.49700 | 81.54 |
| 17 | −59.4100 | 1.000 | 1.90366 | 31.32 |
| 18 | 16.6820 | 1.212 | | |
| 19* | 15.1130 | 3.778 | 1.58313 | 59.38 |
| 20* | −26.6135 | Variable | | |
| 21 | 52.0812 | 2.874 | 1.59270 | 35.31 |
| 22 | −2175.3816 | 1.000 | 1.72916 | 54.68 |
| 23 | 23.8370 | Variable | | |
| 24 | 407.7758 | 3.568 | 1.75520 | 27.51 |
| 25 | −90.9381 | 10.7964 | | |
| 36 | ∞ | 4.000 | 1.51633 | 64.14 |
| 37 | ∞ | 0.800 | | |
| Image plane (Image pickup surface) | ∞ | | | |

Aspherical surface data

6th surface k = 7.1531
A4 = −5.4481E−06, A6 = 1.8485E−08, A8 = −7.2663E−11,
A10 = 6.8327E−14

7th surface k = −0.1612
A4 = −1.7099E−05, A6 = −5.7089E−08, A8 = 2.9598E−10,
A10 = −3.6426E−12

14th surface k = −1.0641
A4 = 5.0796E−06, A6 = −2.1493E−08, A8 = 4.2219E−11

-continued

Unit mm

15th surface k = −0.0406
A4 = −1.0927E−05, A6 = 4.0710E−09, A8 = −1.0459E−10

19th surface k = −0.9004
A4 = −3.1993E−05, A6 = 7.3434E−08, A8 = 1.4665E−10

20th surface k = −5.9367
A4 = −1.6404E−05, A6 = 6.0494E−08, A8 = 6.9852E−11

|  | wide | standard | tele |
|---|---|---|---|
| Zoom data | | | |
| Focal length | 12.24 | 24.30 | 49.20 |
| Fno. | 2.88 | 3.43 | 4.08 |
| 2ω | 87.51° | 47.00° | 24.10° |
| IH | 10.820 | 10.820 | 10.820 |
| FB (in air) | 14.234 | 14.234 | 14.234 |
| Lens total length (in air) | 107.672 | 120.646 | 152.973 |
| d1 | 0.7274 | 17.2131 | 42.1324 |
| d12 | 23.7721 | 8.5457 | 0.9990 |
| d20 | 1.0000 | 2.1329 | 2.0746 |
| d23 | 7.3103 | 17.8920 | 32.9051 |
| Focus data | | | |
| direction of movement | image side | image side | image side |
| amount of movement | 1.152 | 2.851 | 6.981 |
| Unit focal length | | | | f1 = 134.5341   f2 = −16.2889   f3 = 22.5273   f4 = −54.2240
f5 = 98.7628

Aberration diagrams of the zoom lenses according to the first to seventh examples are respectively given as FIGS. 8A, 8B, 8C, 8D, 8E, 8F, 8G, 8H, 8I, 8J, 8K, and 8L to FIGS. 21A, 21B, 21C, 21D, 21E, 21F, 21G, 21H, 21I, 21J, 21K, and 21L. For each embodiment, aberration diagrams in the state in which the zoom lens is focused on an object point at infinity and aberration diagrams in the state in which the zoom lens is focused on an object point at a short distance are given. Among the aberration diagrams, FIGS. 8A to 8L, FIGS. 10A to 10L, FIGS. 12A to 12L, FIGS. 14A to 14L, FIGS. 16A to 16L, FIGS. 18A to 18L, and FIGS. 20A to 20L are aberration diagrams in the state in which the zoom lens is focused on an object point at infinity. In the aberration diagrams, "FIY" represents the largest image height.

Among the aberration diagrams, FIGS. 8A, 9A, 10A, 11A, 12A, 13A, 14A, 15A, 16A, 17A, 18A, 19A, 20A, and 21A show spherical aberration (SA), FIGS. 8B, 9B, 10B, 11B, 12B, 13B, 14B, 15B, 16B, 17B, 18B, 19B, 20B, and 21B show astigmatism (AS), FIGS. 8C, 9C, 10C, 11C, 12C, 13C, 14C, 15C, 16C, 17C, 18C, 19C, 20C, and 21C show distortion (DT), and FIGS. 8D, 9D, 10D, 11D, 12D, 13D, 14D, 15D, 16D, 17D, 18D, 19D, 20D, and 21D show the chromatic aberration of magnification (CC). These diagrams show aberrations at the wide angle end.

FIGS. 8E, 9E, 10E, 11E, 12E, 13E, 14E, 15E, 16E, 17E, 18E, 19E, 20E, and 21E show spherical aberration (SA), FIGS. 8F, 9F, 10F, 11F, 12F, 13F, 14F, 15F, 16F, 17F, 18F, 19F, 20F, and 21F show astigmatism (AS), FIGS. 8G, 9G, 10G, 11G, 12G, 13G, 14G, 15G, 16G, 17G, 18G, 19G, 20G, and 21G show distortion (DT), and FIGS. 8H, 9H, 10H, 11H, 12H, 13H, 14H, 15H, 16H, 17H, 18H, 19H, 20H, and 21H show the chromatic aberration of magnification (CC). These diagrams show aberrations in an intermediate focal length state.

FIGS. 8I, 9I, 10I, 11I, 12I, 13I, 14I, 15I, 16I, 17I, 18I, 19I, 20I, and 21I show spherical aberration (SA), FIGS. 8J, 9J, 10J, 11J, 12J, 13J, 14J, 15J, 16J, 17J, 18J, 19J, 20J, and 21J show astigmatism (AS), FIGS. 8K, 9K, 10K, 11K, 12K, 13K, 14K, 15K, 16K, 17K, 18K, 19K, 20K, and 21K show distortion (DT), and FIGS. 8L, 9L, 10L, 11L, 12L, 13L, 14L, 15L, 16L, 17L, 18L, 19L, 20L, and 21L show the chromatic aberration of magnification (CC). These diagrams show aberrations at the telephoto end.

Next, the values of conditional expressions (1) to (15) in each example are shown below.

|  | Example 1 | Example 2 | Example 3 | Example 4 |
|---|---|---|---|---|
| (1) $v_{3p}$ | 81.54 | 81.61 | 81.54 | 81.54 |
| (2) $|f_2|/FB$ | 0.955 | 1.007 | 0.813 | 0.776 |
| (3) $f_3/FB$ | 1.532 | 1.422 | 1.235 | 1.1403 |
| (4) $|f_4|/f_w$ | 1.928 | 3.233 | 2.110 | 2.176 |
| (5) $D_3/f_w$ | 1.856 | 1.933 | 1.823 | 1.709 |
| (6) $d_{(A)}/D_3$ | 0.230 | 0.208 | 0.139 | 0.169 |
| (7) $f_3/f_{3r}$ | 0.788 | 0.673 | 1.307 | 1.564 |
| (8) $v_{1n}$ | 23.78 | 20.88 | 25.42 | 18.90 |
| (9) $n_{2p}$ | 1.92286 | 2.00069 | 1.75520 | 1.84666 |
| (10) $|f_2|/i_h$ | 1.187 | 1.363 | 1.152 | 1.212 |
| (11) $f_3/i_h$ | 1.903 | 1.924 | 1.751 | 1.781 |
| (12) $Fno_{(w)}$ | 2.88 | 2.88 | 2.88 | 2.88 |
| (13) $Fno_{(t)}$ | 2.88 | 2.88 | 2.88 | 2.88 |
| (14) $f_t/f_w$ | 3.19 | 3.20 | 3.19 | 3.20 |
| (15) $f_w/i_h$ | 1.13 | 1.13 | 1.13 | 1.13 |

|  | Example 5 | Example 6 | Example 7 |
|---|---|---|---|
| (1) $v_{3p}$ | 81.54 | 81.54 | 81.54 |
| (2) $|f_2|/FB$ | 0.798 | 0.928 | 1.144 |
| (3) $f_3/FB$ | 1.206 | 1.270 | 1.583 |
| (4) $|f_4|/f_w$ | 1.948 | 1.817 | 4.430 |
| (5) $D_3/f_w$ | 1.827 | 1.628 | 1.690 |
| (6) $d_{(A)}/D_3$ | 0.158 | 0.157 | 0.408 |
| (7) $f_3/f_{3r}$ | 1.619 | 1.289 | 0.988 |
| (8) $v_{1n}$ | 18.90 | 23.78 | 23.78 |
| (9) $n_{2p}$ | 1.75520 | 1.84666 | 1.90366 |
| (10) $|f_2|/ih$ | 1.179 | 1.261 | 1.505 |
| (11) $f_3/i_h$ | 1.783 | 1.726 | 2.082 |
| (12) $Fno_{(w)}$ | 2.88 | 2.88 | 2.88 |
| (13) $Fno_{(t)}$ | 2.88 | 2.88 | 4.08 |
| (14) $f_t/fw$ | 3.19 | 3.20 | 4.02 |
| (15) $f_w/i_h$ | 1.13 | 1.13 | 1.13 |

Figure 22:
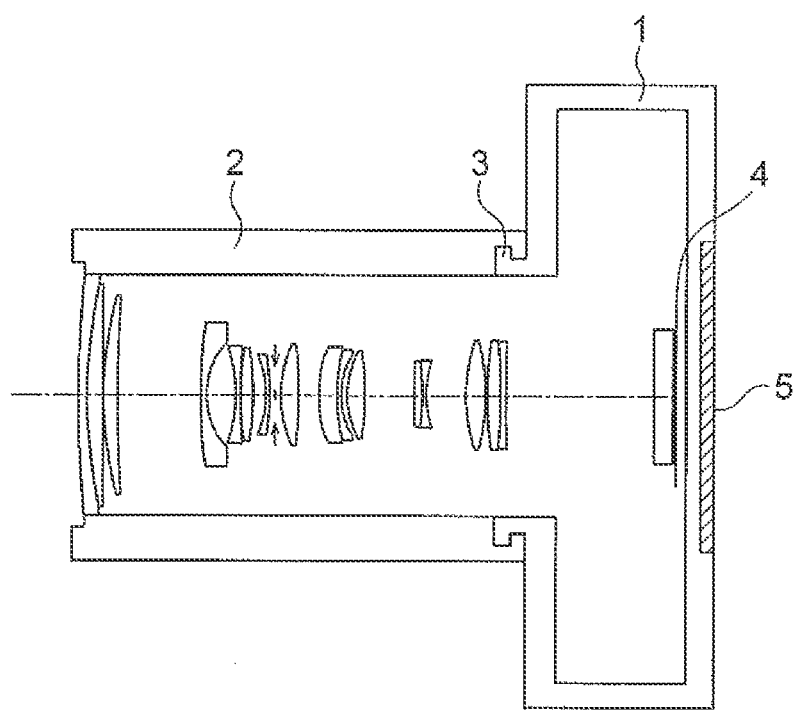
FIG. 22 is a cross sectional view of an interchangeable-lens camera on which a zoom lens according to the present invention is mounted as a taking optical system.

FIG. 22 is a cross-sectional view of an interchangeable lens camera as an electronic image pickup apparatus. The interchangeable lens camera is a single-lens mirrorless camera which is a camera of the type not to have a quick return mirror, for example. In FIG. 22, a taking optical system 2 is disposed inside a lens barrel of a single-lens mirrorless camera 1. A mount portion 3 enables the taking optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking optical system 2 of the single-lens mirrorless camera 1, the zoom lens described in any one of the examples from the first example to the seventh example is to be used.

Figure 23:
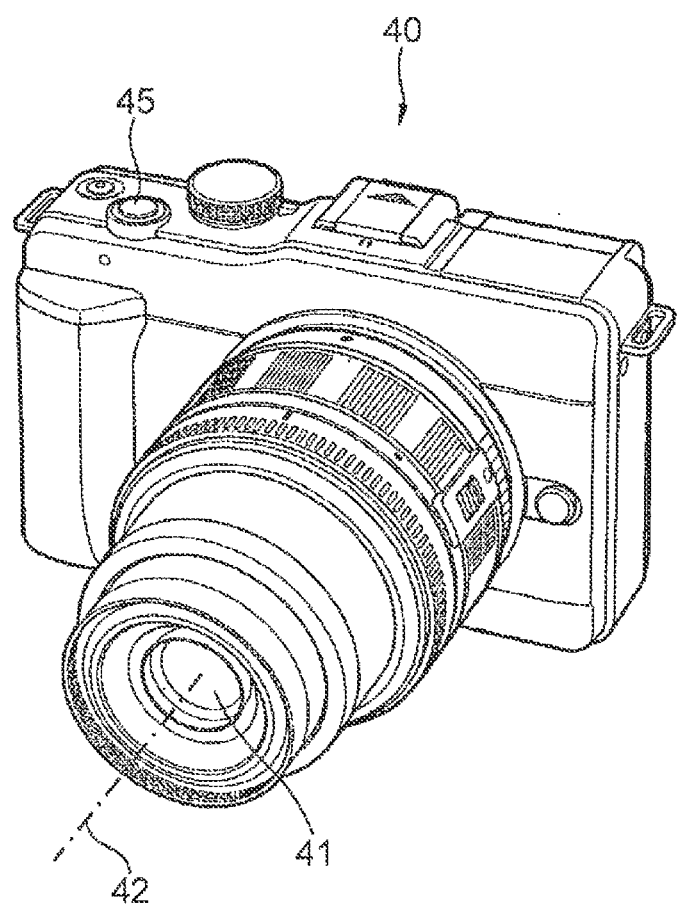
FIG. 23 is a front perspective view showing the appearance of the interchangeable-lens camera.
Figure 24:
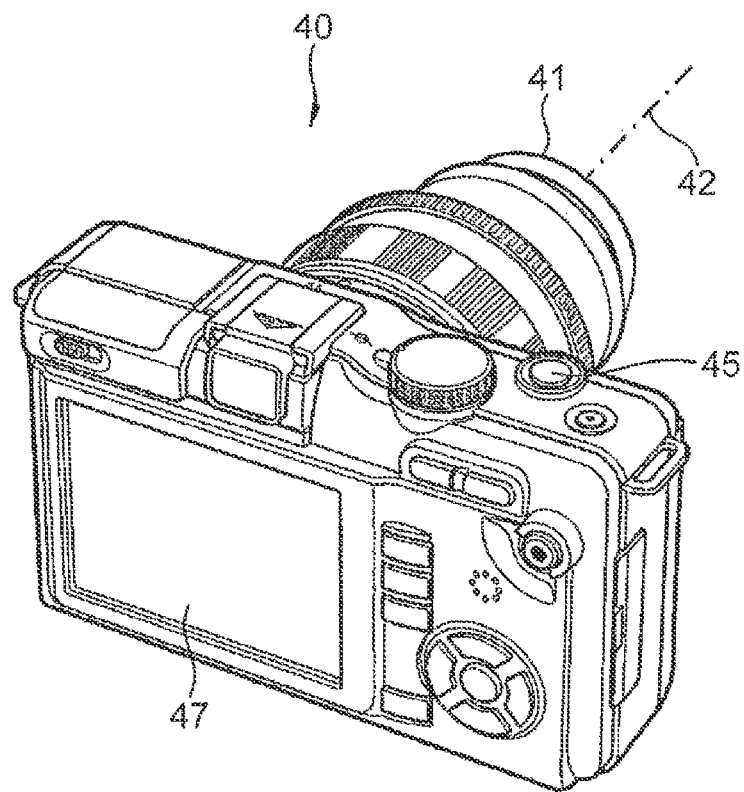
FIG. 24 is a rear perspective view of the interchangeable-lens camera.

FIG. 23 and FIG. 24 are conceptual diagrams of an arrangement of the image pickup apparatus which has the zoom lens according to the present example. FIG. 23 is a front perspective view showing an appearance of a single-lens mirrorless camera 40 as the image pickup apparatus, and FIG. 24 is a rear perspective view of the single-lens mirrorless camera 40. The zoom lens according to the present example is used in a photographic optical system 41 of the single-lens mirrorless camera 40.

The single-lens mirrorless camera 40 according to the present embodiment includes the photographic optical system 41 which is positioned in a photographic optical path 42, a shutter button 45, and a liquid-crystal display monitor 47. As the shutter button 45 disposed on an upper portion of the single-lens mirrorless camera 40 is pressed, in conjunction with the pressing of the shutter button 45, photography is carried out by the photographic optical system 41 such as the zoom lens according to the first example. An object image which is formed by the photographic optical system. 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 25:
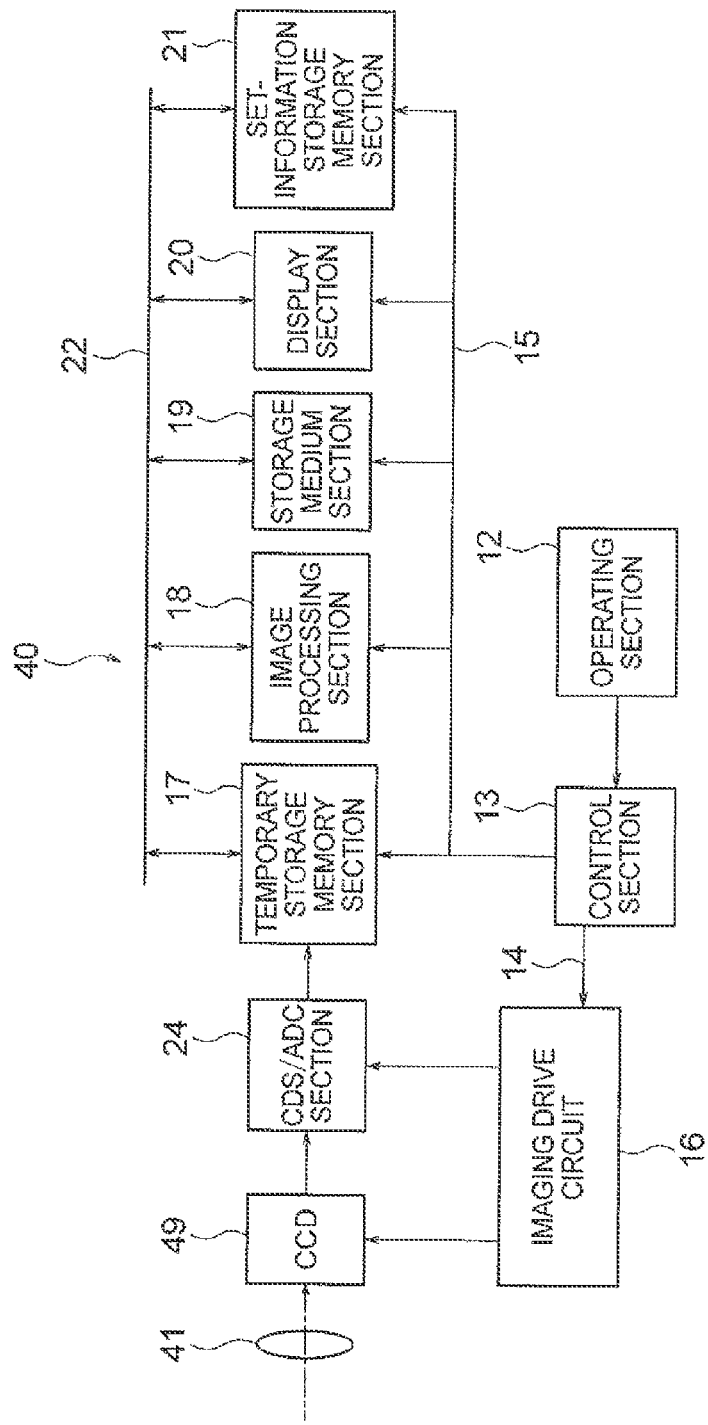
FIG. 25 is a block diagram showing the relevant internal circuit configuration of the interchangeable-lens camera.

FIG. 25 is a structural block diagram of an internal circuit of main components of the single-lens mirrorless camera 40. In the following description, the processing means described above includes for instance, a CDS/ADC section 24, a temporary storage memory 117, and an image processing section 18, and a storage means consists of a storage medium section 19 for example.

As shown in FIG. 25, the single-lens mirrorless camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire single-lens mirrorless camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The single-lens mirrorless camera 40 structured in such manner can be an image pickup apparatus in which the magnitude of operation noise generated during zooming and focusing is low, and that is small in size, has excellent optical performance, and can generate images with low noise when the images are picked up in dark place is desired.

As described above, the zoom lens according to the present invention is useful when the entrance of dust into the optical system is to be reduced, operation noise is to be reduced, and small size and excellent optical performance are to be achieved as well as sufficiently high lens speed throughout the entire zoom range and high zoom ratio. The image pickup apparatus according to the present invention is useful when an image pickup apparatus in which the magnitude of operation noise generated during zooming and focusing is low, and that is small in size, has excellent optical performance, and can generate images with low noise when the images are picked up in dark place is desired.

What is claimed is:

1. A zoom lens comprising, in order from the object side to the image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power, wherein
   the first lens unit is located closest to the object side among the lens units in the zoom lens,
   the fifth lens unit is located closest to the image side among the lens units in the zoom lens,
   during zooming from the wide angle end to the telephoto end, the first lens unit, the second lens unit, the third lens unit, and the fourth lens unit move, the fifth lens unit is stationary, and the distances between the lens units vary,
   the third lens includes a positive lens, and
   the following conditional expression (1) is satisfied:

$$72 < \nu_{3p} < 110 \tag{1}$$

where, $\nu_{3p}$ is the Abbe constant of the positive lens in the third lens unit with respect to the d-line or the largest Abbe constant among the Abbe constants of positive lenses included in the third lens unit if the third lens unit includes two or more positive lenses.

2. The zoom lens according to claim 1, wherein the fourth lens unit moves during focusing.

3. The zoom lens according to claim 1, wherein the fourth lens unit is oscillated along the direction of the optical axis in an in-focus state, and when the distance to an object changes, the fourth lens unit is moved for focusing by a distance larger than the amplitude of the oscillation.

4. The zoom lens according to claim 1, wherein the third lens unit includes an aspheric lens surface.

5. The zoom lens according to claim 1, wherein the following conditional expressions (2) and (3) are satisfied:

$$0.4 < |f_2|/FB < 1.5 \quad (2),$$

and $$0.5 < f_3/FB < 1.8 \quad (3),$$

where,
$f_2$ is the focal length of the second lens unit,
$f_3$ is the focal length of the third lens unit, and
FB is the equivalent air distance from the image side surface of the lens closest to the image side among the lenses in the zoom lens to the image plane.

6. The zoom lens according to claim 1, wherein the following conditional expression (4) is satisfied:

$$1.0 < |f_4|/f_w < 5.0 \quad (4),$$

where,
$f_4$ is the focal length of the fourth lens unit, and
$f_w$ is the focal length of the entire zoom lens system at the wide angle end.

7. The zoom lens according to claim 1, wherein the first lens unit comprises a negative lens, and the following conditional expression (8) is satisfied:

$$15 < v_{1n} < 30 \quad (8),$$

where,
$v_{1n}$ is the Abbe constant of the negative lens in the first lens unit with respect to the d-line or the largest Abbe constant among the Abbe constants of negative lenses included in the first lens unit if the first lens unit includes two or more negative lenses.

8. The zoom lens according to claim 1, wherein the second lens unit comprises a positive lens, and the following conditional expression (9) is satisfied:

$$1.70 < n_{2p} < 2.15 \quad (9),$$

where,
$n_{2p}$ is the refractive index of the positive lens in the second lens unit with respect to the d-line or the largest refractive index among the refractive indexes of positive lenses included in the second lens unit if the second lens unit includes two or more positive lenses.

9. The zoom lens according to claim 1, wherein the following conditional expressions (10) and (11) are satisfied:

$$0.5 < |f_2|/i_h < 1.9 \quad (10),$$

and $$0.7 < f_3/i_h < 2.5 \quad (11),$$

where,
$f_2$ is the focal length of the second lens unit,
$f_3$ is the focal length of the third lens unit, and
$i_h$ is the largest image height in the entire zoom lens system.

10. The zoom lens according to claim 1, wherein the following conditional expressions (12), (13), and (14) are satisfied:

$$1.7 < Fno_{(w)} < 3.4 \quad (12),$$

$$2.3 < Fno_{(t)} < 4.3 \quad (13),$$

and $$2.7 < f_t/f_w < 7.0 \quad (14),$$

where,
$Fno_{(w)}$ is the smallest value of the F-number of the entire zoom lens system at the wide angle end,
$Fno_{(t)}$ is the smallest value of the F-number of the entire zoom lens system at the telephoto end,
$f_w$ is the focal length of the entire zoom lens system at the wide angle end, and
$f_t$ is the focal length of the entire zoom lens system at the telephoto end.

11. The zoom lens according to claim 1, wherein the following conditional expression (15) is satisfied:

$$0.9 < f_w/i_h < 1.5 \quad (15),$$

where,
$f_w$ is the focal length of the entire zoom lens system at the wide angle end, and
$i_h$ is the largest image height in the entire zoom lens system.

12. An image pickup apparatus comprising:
a zoom lens according to claim 1; and
an image pickup element arranged on the image side of the zoom lens to convert an image formed by the zoom lens into an electrical signal.

13. The zoom lens according to claim 1, wherein the following conditional expression (1-1) is satisfied:

$$75 < v_{3p} < 110 \quad (1-1).$$

14. The zoom lens according to claim 13, wherein the following conditional expression (1-2) is satisfied:

$$77 < v_{3p} < 110 \quad (1-2).$$

15. The zoom lens according to claim 1, wherein the third lens unit consists of two sub lens units including an object side sub lens unit and an image side sub lens unit respectively arranged on the object side and on the image side with the largest axial space among the axial spaces in the third lens unit therebetween, and the object side sub lens unit and the image side sub lens unit have positive refractive powers.

16. The zoom lens according to claim 15, wherein the following conditional expressions (5), (6), and (7) are satisfied:

$$1.4 < D_3/f_w < 2.1 \quad (5),$$

$$0.11 < d_{(A)}/D_3 < 0.5 \quad (6),$$

and $$0.5 < f_{3f}/f_{3r} < 2.3 \quad (7),$$

where, $D_3$ is the axial thickness of the third lens unit, $d_{(A)}$ is the axial distance between the object side sub lens unit and the image side sub lens unit, $f_{3f}$ is the focal length of the object side sub lens unit, and $f_{3r}$ is the focal length of the image side sub lens unit.

17. The zoom lens according to claim 15, wherein the lens surface located closest to the object side among the lens surfaces in the third lens unit and the lens surface located closest to the image side among the lens surfaces in the third lens unit are both aspheric.

18. The zoom lens according to claim 15, wherein the third lens unit consists, in order from the object side to the image side, of a first positive lens component, a second positive lens component, and a cemented lens component made up of a negative lens and a positive lens arranged in order from the object side, or of a first lens component, a cemented lens component made up of a positive lens and a negative lens arranged in order from the object side, and a second positive lens component, where the term "lens component" refers to a lens block whose surfaces that are in contact with air on the optical axis are only its object side surface and its image side surface.

19. A zoom lens comprising, in order from the object side to the image side:

a first lens unit having a positive refractive power;

a second lens unit having a negative refractive power;

a third lens unit having a positive refractive power;

a fourth lens unit having a negative refractive power; and a fifth lens unit having a positive refractive power, wherein the first lens unit is located closest to the object side among the lens units in the zoom lens, the fifth lens unit is located closest to the image side among the lens units in the zoom lens, during zooming from the wide angle end to the telephoto end, the first lens unit, the second lens unit, the third lens unit, and the fourth lens unit move, the fifth lens unit is stationary, and the distances between the lens units vary, the third lens unit includes an aspheric lens surface, the fourth lens unit moves during focusing, and the following conditional expressions (2) and (3) are satisfied:

$$0.4 < |f_2|/FB < 1.5 \quad (2),$$

and $$0.5 < f_3/FB < 1.8 \quad (3),$$

where, $f_2$ is the focal length of the second lens unit, $f_3$ is the focal length of the third lens unit, and FB is the equivalent air distance from the image side surface of the lens closest to the image side among the lenses in the zoom lens to the image plane.

20. A zoom lens comprising, in order from the object side to the image side:

a first lens unit having a positive refractive power;

a second lens unit having a negative refractive power;

a third lens unit having a positive refractive power;

a fourth lens unit having a negative refractive power; and a fifth lens unit having a positive refractive power, wherein the first lens unit is located closest to the object side among the lens units in the zoom lens, the fifth lens unit is located closest to the image side among the lens units in the zoom lens, during zooming from the wide angle end to the telephoto end, the first lens unit, the second lens unit, the third lens unit, and the fourth lens unit move, the fifth lens unit is stationary, and the distances between the lens units vary, the third lens unit includes an aspheric lens surface, the fourth lens unit moves during focusing, and the following conditional expressions (10) and (11) are satisfied:

$$0.5 < |f_2|/i_h < 1.9 \quad (10),$$

and $$0.7 < f_3/i_h < 2.5 \quad (11),$$

where, $f_2$ is the focal length of the second lens unit, $f_3$ is the focal length of the third lens unit, and $i_h$ is the largest image height in the entire zoom lens system.

* * * * *